United States Patent
Gumaste et al.

(10) Patent No.: US 7,515,828 B2
(45) Date of Patent: Apr. 7, 2009

(54) SYSTEM AND METHOD FOR IMPLEMENTING OPTICAL LIGHT-TRAILS

(75) Inventors: Ashwin Anil Gumaste, Dallas, TX (US); Paparao Palacharla, Richardson, TX (US); Susumu Kinoshita, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 623 days.

(21) Appl. No.: 11/080,752

(22) Filed: Mar. 15, 2005

(65) Prior Publication Data

US 2006/0210273 A1    Sep. 21, 2006

(51) Int. Cl.
*H04J 14/02* (2006.01)
(52) U.S. Cl. .............................. 398/83; 398/82; 398/100
(58) Field of Classification Search .................. 398/82, 398/83, 85, 100
See application file for complete search history.

(56) References Cited

U.S. PATENT DOCUMENTS

| | | | |
|---|---|---|---|
| 4,651,316 A | 3/1987 | Kocan et al. ................. | 370/462 |
| 5,258,978 A | 11/1993 | Cloonan et al. ............. | 370/411 |
| 5,469,428 A | 11/1995 | Tokura et al. | |
| 5,724,166 A | 3/1998 | Nakata | |
| 5,854,700 A | 12/1998 | Ota | |
| 5,903,371 A | 5/1999 | Arecco et al. | |
| 6,160,648 A | 12/2000 | Oberg et al. | |
| 6,169,746 B1 | 1/2001 | Ueda et al. ................... | 370/466 |

(Continued)

FOREIGN PATENT DOCUMENTS

WO    WO 03/104849 A2    12/2003

OTHER PUBLICATIONS

Banaerjee et al., "Generalized Multiprotocol Label Switching: An Overview of Routing and Management Enhancements," IEEE Communications Magazine, Jan. 2001, pp. 144-149.

(Continued)

*Primary Examiner*—Dzung D Tran
(74) *Attorney, Agent, or Firm*—Baker Botts L.L.P.

(57) ABSTRACT

An optical network is disclosed that carries optical traffic in multiplexed wavelengths between a number of nodes. The network includes at least one light-trail associated with one of the wavelengths and established between a convener node and an end node, and including one or more intervening nodes. The network also includes an out-of-band control channel that is associated with a different wavelength than the light-trail. The control channel is used to communicate control messages to establish the light-trail and to allocate use of the light-trail by the convener node and the intervening nodes. Each of the convener node, the one or more intervening nodes, and the end node is operable to receive optical traffic in a number of multiplexed wavelengths from the optical network, drop a first copy of the multiplexed optical traffic from the optical network, and forward a second copy of the multiplexed optical traffic on the optical network. These nodes also forward the optical traffic in selected wavelengths of the dropped first copy for communication to one or more client devices associated with the node. The nodes further convert traffic received from one or more client devices of the node into client optical traffic in one or more wavelengths, passively add the client optical traffic to the second copy or to a modification of the second copy to form a combined signal, and forward the combined signal to the network.

22 Claims, 5 Drawing Sheets

U.S. PATENT DOCUMENTS

| | | | |
|---|---|---|---|
| 6,195,186 B1 | 2/2001 | Asahi | |
| 6,504,849 B1 | 1/2003 | Wang et al. | 370/455 |
| 6,567,194 B1 | 5/2003 | Badr | 398/1 |
| 6,594,232 B1 | 7/2003 | Dupont | |
| 6,631,134 B1 | 10/2003 | Zadikian et al. | |
| 6,701,085 B1 | 3/2004 | Muller | |
| 6,728,484 B1 | 4/2004 | Ghani | 398/42 |
| 6,766,113 B1 | 7/2004 | Al-Salameh et al. | |
| 6,775,477 B2 | 8/2004 | Badr | 398/1 |
| 6,795,394 B1 | 9/2004 | Swinkels et al. | |
| 6,850,711 B2 | 2/2005 | Tsuruta | 398/168 |
| 6,882,799 B1 | 4/2005 | Beshai et al. | |
| 6,889,007 B1 | 5/2005 | Wang et al. | 398/79 |
| 7,016,363 B1 | 3/2006 | Reed et al. | |
| 7,023,796 B2 | 4/2006 | De Girolamo et al. | |
| 7,031,299 B2 | 4/2006 | Chaudhuri et al. | |
| 7,088,920 B2 | 8/2006 | Krishnaswamy et al. | |
| 7,184,663 B2 * | 2/2007 | Kinoshita et al. | 398/59 |
| 7,218,854 B1 | 5/2007 | Unitt et al. | |
| 7,266,296 B2 | 9/2007 | Ovadia et al. | |
| 7,308,198 B1 | 12/2007 | Chudak et al. | |
| 2002/0114030 A1 | 8/2002 | Dwivedi et al. | |
| 2003/0189920 A1 | 10/2003 | Erami et al. | |
| 2003/0223104 A1 * | 12/2003 | Kinoshita et al. | 359/333 |
| 2003/0223682 A1 * | 12/2003 | Kinoshita et al. | 385/24 |
| 2003/0235153 A1 | 12/2003 | Lee et al. | |
| 2004/0034753 A1 | 2/2004 | Jeddeloh | |
| 2004/0052530 A1 | 3/2004 | Tian et al. | |
| 2004/0234263 A1 | 11/2004 | Ovadia et al. | |
| 2004/0252995 A1 | 12/2004 | Ovadia et al. | |
| 2005/0013613 A1 | 1/2005 | Stevenson et al. | |
| 2005/0088964 A1 | 4/2005 | Yang et al. | |
| 2005/0191054 A1 * | 9/2005 | Aoki et al. | 398/45 |
| 2006/0013584 A1 | 1/2006 | Miyazaki | |
| 2006/0056279 A1 | 3/2006 | Pronk et al. | |
| 2006/0188258 A1 | 8/2006 | Gumaste et al. | |
| 2006/0210268 A1 | 9/2006 | Gumaste et al. | |
| 2006/0210273 A1 | 9/2006 | Gumaste et al. | |
| 2006/0222360 A1 | 10/2006 | Gumaste et al. | |
| 2006/0228112 A1 | 10/2006 | Gumaste et al. | |
| 2006/0245755 A1 | 11/2006 | Gumaste et al. | |
| 2007/0019662 A1 | 1/2007 | Gumaste et al. | |
| 2007/0047958 A1 | 3/2007 | Gumaste et al. | |
| 2007/0121507 A1 | 5/2007 | Manzalini et al. | |
| 2007/0255640 A1 | 11/2007 | Gumaste et al. | |

OTHER PUBLICATIONS

Bertsekas, Dimitri, "The Auction Algorithm: A Distributed Relaxation Method for the Assignment Problem," Report LIDS-P-1653, Mar. 1987, Revised Sep. 1987, pp. 1-27.

Chlamtac et al., "Bandwidth Management in Community Networks," Center for Advance Telecommunications Systems and Services, pp. 1-11, 2002, IWDC, LNCS 2571.

Chlamtac et al., Lightpath Communications: An Approach to High Bandwidth Optical WAN's, IEEE Transactions on Communications, vol. 40, No. 7, Jul. 1992, pp. 1171-1182.

Chlamtac et al., "Light-Trails: A Solution to IP Centric Communication in the Optical Domain," 11 pages, Center for Advance Technology Systems and Services, University of Texas at Dallas, Texas 75083, USA, Quality of Service in Multiservice IP Networks, Second International Workshop, QoS-IP Feb. 2003.

Dolzer et al., "Evaluation of Reservation Mechanisms for Optical Burst Switching," 8 pages, 2001, AEU Int. J. Electron. Commun. 55 No. 1, 1-1.

Fang et al., "Optimal Light Trail Design in WDM Optical Networks," IEEE Communications Society, 2004 IEEE, pp. 1699-1703.

Foster, "The Grid Blue Print for a New Computing Infrastructure," Morgan Kauffman, Nov. 1998, pp. 479-532.

Frederick et al., "Light Trails: A Sub-Wavelength Solution for Optical Networking," 2004 IEEE, 2004 Workshop on High Performance Switching and Routing, Apr. 19-21, 2004.

Fumagalli et al., "The Multi-Token Inter-Arrival Time (MTIT) Access Protocol for Supporting IP over WDM Ring Network," 1999 IEEE, pp. 586-590.

Ghani et al., "On IP-Over-WDM Integration," IEEE Communications Magazine, Mar. 2000, pp. 72-84, WDM Optical Networks: A Reality Check.

Gumaste et al., "A Scheduling Procedure for Control Signaling in Optical Burst Switched Network," in Proceedings for the First International Conference on Optical Communications and Networks, Nov. 11-14, 2002, pp. 190-193.

Gumaste et al., Bifurcated Traffic and Channel Assignment (BITCA) to Interconnected Metro Rings, 3 pages, OFC 2002.

Gumaste et al., "Light-Frames: A Pragmatic Framework for Optical Packet Transport," IEEE Communications Society, pp. 1537-1542, 2004.

Gumaste et al., "Light-Trail and Light-Frame Architectures for Optical Networks," PHD Thesis, University of Texas Dallas, Dec. 2003.

Gumaste et al., "Light-Trails: A Novel Conceptual Framework for Conducting Optical Communications," Center for Advanced Telecommunications Services and Studies, 7 pages, 2003.

Gumaste et al., Light Trails: An Optical Solution for IP Transport, J. Opt. Net., vol. 3, 2004, pp. 261-281, Center for Advanced Telecommunications Systems and Services, The University of Texas at Dallas, May 2004, vol. 3, No. 5, Journal of Optical Networking, pp. 261-281.

Gumaste et al., "Heuristic and Optimal Techniques for Light-Trail Assignment in Optical WDM Networks," Photonics Networking Laboratory, 7 pages, unknown.

Gumaste et al., Mesh Implementation of Light Trails: A Solution to IP Centric Communication, 6 pages, Center for Advanced Telecommunications Services and Studies, unknown.

Gumaste et al., "Next-Generation Optical Storage Area Networks: The Light-Trails Approach," Optical Storage Area Networks, IEEE Communications Magazine, Mar. 2005, pp. 72-79.

Gumaste et al., "Optimizing Light-Trail Assignment to WDM Networks for Dynammic IP Centric Traffic," pp. 113-118, unknown.

Gumaste et al. Performance Evaluation and Demonstration of Light Trails in Shared Wavelength Optical Networks (SWONSs), 2 pages, date unknown.

Gumaste et al., "Providing Bandwidth on Demand to End-Users by Adaptations to a GMPLS Framework: The Light-Trails Approach," National Fiber Optics Engineers Conference, 2003 Technical Proceedings, pp. 1137-1141.

Gumaste et al., "Optical Implementation of Resilient Packet Rings Using Light-Trails," Advanced Computer Network and Architecture Laboratory, 7 pages, unknown.

Humblet, "Models of Blocking Probability in All-Optical Networks With and Without Wavelength Changers," IEEE Journal on Selected Areas in Communications, Jun. 1996, vol. 14, No. 5, ISACEM, 11 pages.

Kinoshita, S.. "Broadband Fiber Optic Amplifiers," OFC 2001, Optical Fiber Communications Conference and Exhibit, Mar. 17-22, 2001, 5 pages.

Ota et al., "High-Speed, Burst-Mode, Packet-Capable Optical Receiver and Instantaneous Clock Recovery for Optical Bus Operation," Journal of Lightwave Technology, vol. 12, No. 2, Feb. 1994, pp. 325-331.

Qiao et al., "On an IP-Centric Optical Control Plane" Intelligence in Optical Networks, IEEE Communication Magazine, Sep. 2001, pp. 88-93.

Ramaswami et al., "Routing and Wavelengths Assignment in All-Optical Networks," IEEE/ACM Transactions on Networking, Oct. 1995, vol. 5, No. 3, pp. 489-500.

Resilient Packet Ring Alliance, "An Introduction to Resilient Packet Ring Technology," A White Paper by the Resilient Packet Ring Alliance, Oct. 2001, pp. 1-16.

Sahasrabuddhe et al., "Fault Management in IP-Over-WDM Networks: WDM Protection versus IP Restoration," IEEE Journal on Selected Areas in Communications, vol. 20, No. 1, Jan. 2002, pp. 21-33.

Sasaki et al., "The Interface Between IP and WDM and Its Effect on the Cost of Survivability," IEEE Communications Magazine, Jan. 2003, World Telecommunications Congress 2002 (WTC 2002), pp. 74-79.

Shrinkhande et al., "CSMA/CA MAC Protocols for IP Hornet: An IP Hornet: An IP Over WDM Metropolitan Area Ring Network," Stanford University Optical Communications Research Laboratory, 5 pages, 2000.

Spadaro et al., "Positioning of the RPR Standard in Contemporary Operator Environments," 10 pages, unknown.

Tancevski et al., "Optical Routing as Asynchronous, Variable Length Packets," IEEE Journal on Selected Areas in Communications, vol. 18, No. 10, Oct. 2000, pp. 2084-2093.

Verma et al., "Optical Burst Switching: A Viable Solution for Terabit IP Backbone," IEEE Network Magazine, vol. 14, No. 6, Nov./Dec. 2000, pp. 48-53.

Yoo et al., "Just Enough Time (JET): A High Speed Protocol for Bursty Traffic in Optical Networks,:" Proc. IEE/LEOS Tech. Gll, Aug. 1997, pp. 26-27.

Yener et al., "Flow Trees: A Lower Bound Computation Tool for Network Optimization," Columbia Tool for Network Optimization, Columbia Univ. Tech. Rep. CUCS-006-94, unknown.

Zhang et al., "Differentiated Multi Layer Survivability in IP/WDM Networks," in Network Operations and Management Symposium, IEEE, New York, 2002, pp. 681-696.

Zhang et al., "A Heuristic Wavelength Assignment Algorithm for Multihop WDM Networks with Wavelength Routing and Wavelength Reuse," in Proc. INFOCOM 94, 1994, pp. 534-543.

Gumaste, "Method and System for Time Sharing Transmission Frequencies in an Optical Network," U.S. Appl. No. 11/061,255, filed Feb. 18, 2005.

Gumaste, "System and Method for Implementing Optical Light-Trails," U.S. Appl. No. 11/080,051, filed Mar. 15, 2005.

Gumaste, "System and Method for Bandwidth Allocation in an Optical Light-Trail," U.S. Appl. No. 11/218,262, filed Aug. 13, 2005.

Gumaste, "System and Method for Transmission and Reception of Traffic in Optical Light-Trails," U.S. Appl. No. 11/095,246, filed Mar. 30, 2005.

Gumaste, "System and Method for Protecting Optical Light-Trails," U.S. Appl. No. 11/098,720, filed Apr. 4, 2005.

Gumaste, "System and Method for Shaping Traffic in Optical Light-Trails," U.S. Appl. No. 11/118,899, filed Apr. 29, 2005.

Gumaste, "Heuristical Assignment of Light-Trails in a Optical Network," U.S. Appl. No. 11/185,958, filed Jul. 19, 2005.

Gumaste, "System and Method for Bandwidth Allocation in an Optical Light-Trail," U.S. Appl. No. 11/380,812, filed Apr. 28, 2006.

Dutton et al., "Understanding Optical Communications," IBM International Technical Support Organization, Sep. 1998, p. 9, 366, and 367 (3 pages).

Ramaswami et al., "Optical Networks: A Practical Perspective," First Edition, Morgan Kauffman Publications, 1998, pp. 423-462 (41 total pages).

Maille et al., "Multi-Bid Auctions for Bandwidth Allocation in Communications Networks," INFOCOM 2004, Mar. 7-11, 2004, vol. 4, pp. 54-65.

Chiang et al., "Balancing Supply and Demand of Bandwidth in Wireless Cellular: Networks: Utility Maximization Over Powers and Rates," INFOCOM 2004, Mar. 7-11, 2004, vol. 4, pp. 2800-2811.

* cited by examiner

SYSTEM AND METHOD FOR IMPLEMENTING OPTICAL LIGHT-TRAILS

TECHNICAL FIELD

The present invention relates generally to optical networks and, more particularly, to a system and method for implementing optical light-trails in an optical communication network.

BACKGROUND

Telecommunication systems, cable television systems, and data communication networks use optical networks to rapidly convey large amounts of information between remote points. In an optical network, information is conveyed in the form of optical signals through optical fibers. Optical fibers comprise thin strands of glass capable of transmitting optical signals over long distances with very low loss of signal strength.

Recent years have seen an explosion in the use of telecommunication services. As the demand for telecommunication services continues to grow, optical networks are quickly becoming overburdened by the increasing amount of information communicated over such networks. The addition of new networks or the expansion of existing networks may however be too costly to be practical solutions to this problem. Thus, efficient use of network resources has become an important goal in developing and operating optical networks.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels. By using WDM add/drop equipment at network nodes, the entire composite signal can be fully demultiplexed into its constituent channels and switched (added/dropped or passed through). In such networks, traffic from one network node to another network node are often assigned to a particular wavelength on which the traffic is communicated over the network. By assigning different traffic streams to different wavelengths, interference between different traffic streams is prevented. However, in certain situations, this creates inefficiency in the network. For example, if the traffic assigned to a particular wavelength does not typically use much of the bandwidth (capacity) associated with the wavelength, then inefficiencies are created.

SUMMARY

A system and method for implementing optical light-trails in an optical communication network are provided. According to one embodiment, an optical network is provided that carries optical traffic in multiplexed wavelengths between a number of nodes. The network includes at least one light-trail associated with one of the wavelengths and established between a convener node and an end node, and including one or more intervening nodes. The network also includes an out-of-band control channel that is associated with a different wavelength than the light-trail. The control channel is used to communicate control messages to establish the light-trail and to allocate use of the light-trail by the convener node and the intervening nodes. Each of the convener node, the one or more intervening nodes, and the end node is operable to receive optical traffic in a number of multiplexed wavelengths from the optical network, drop a first copy of the multiplexed optical traffic from the optical network, and forward a second copy of the multiplexed optical traffic on the optical network. These nodes also forward the optical traffic in selected wavelengths of the dropped first copy for communication to one or more client devices associated with the node. The nodes further convert traffic received from one or more client devices of the node into client optical traffic in one or more wavelengths, passively add the client optical traffic to the second copy or to a modification of the second copy to form a combined signal, and forward the combined signal to the network.

Technical advantages of certain embodiments of the present invention may include efficient techniques for using transmission resources on optical networks. More specifically, in particular embodiments of the present invention, nodes of an optical network are capable of establishing an optical "light-trail" that includes one or more other nodes for the transmission of optical traffic. Such a light-trail may be shared by the nodes included in the light-trail to transmit traffic to other nodes included in the light-trail. The use of such light-trails may result in more efficient communication of information in the optical network since a number of nodes can share the bandwidth provided by a wavelength at which the light-trail is established.

It will be understood that the various embodiments of the present invention may include some, all, or none of the enumerated technical advantages. In addition other technical advantages of the present invention may be readily apparent to one skilled in the art from the figures, description, and claims included herein.

DETAILED DESCRIPTION OF THE DRAWINGS

Figure 1:
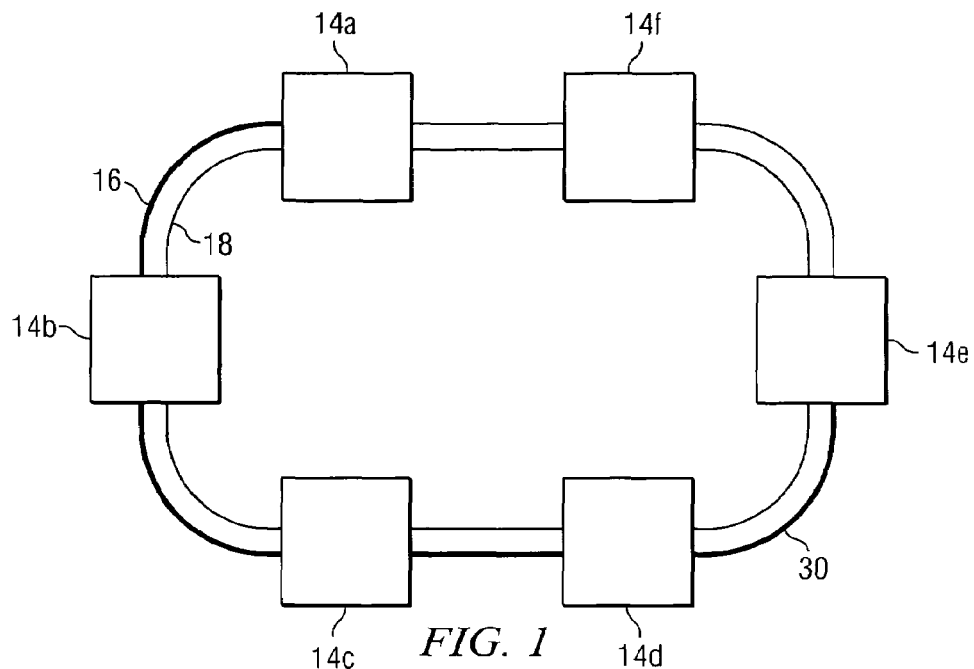
FIG. 1 is a block diagram illustrating an optical ring network in which light-trails may be implemented in accordance with one embodiment of the present invention.

FIG. 1 illustrates an optical network 10 in accordance with one embodiment of the present invention. Optical network 10 includes a plurality of nodes 14 coupled to an optical ring 20. During operation, nodes 14 transmit and receive traffic on optical ring 20 on one of a plurality of wavelengths. In particular, a light-trail, such as light-trail 30 in FIG. 1, may be established over which nodes 14 may transmit optical traffic to other nodes 14 located on that light-trail. Nodes included in a light-trail share the light-trail, as appropriate, to transmit information to other nodes included in the light-trail on a wavelength associated with the light-trail. Thus, a light-trail is a generalization of a light path (an optical wavelength circuit) such that multiple nodes along the path can take part in communication along the path. Therefore, the use of these light-trails addresses the inefficiency discussed above associated with assigning a wavelength for traffic communicated from a single node to another node. In addition, light-trail communications allow optical multicasting and dynamic provisioning.

Figure 2A:
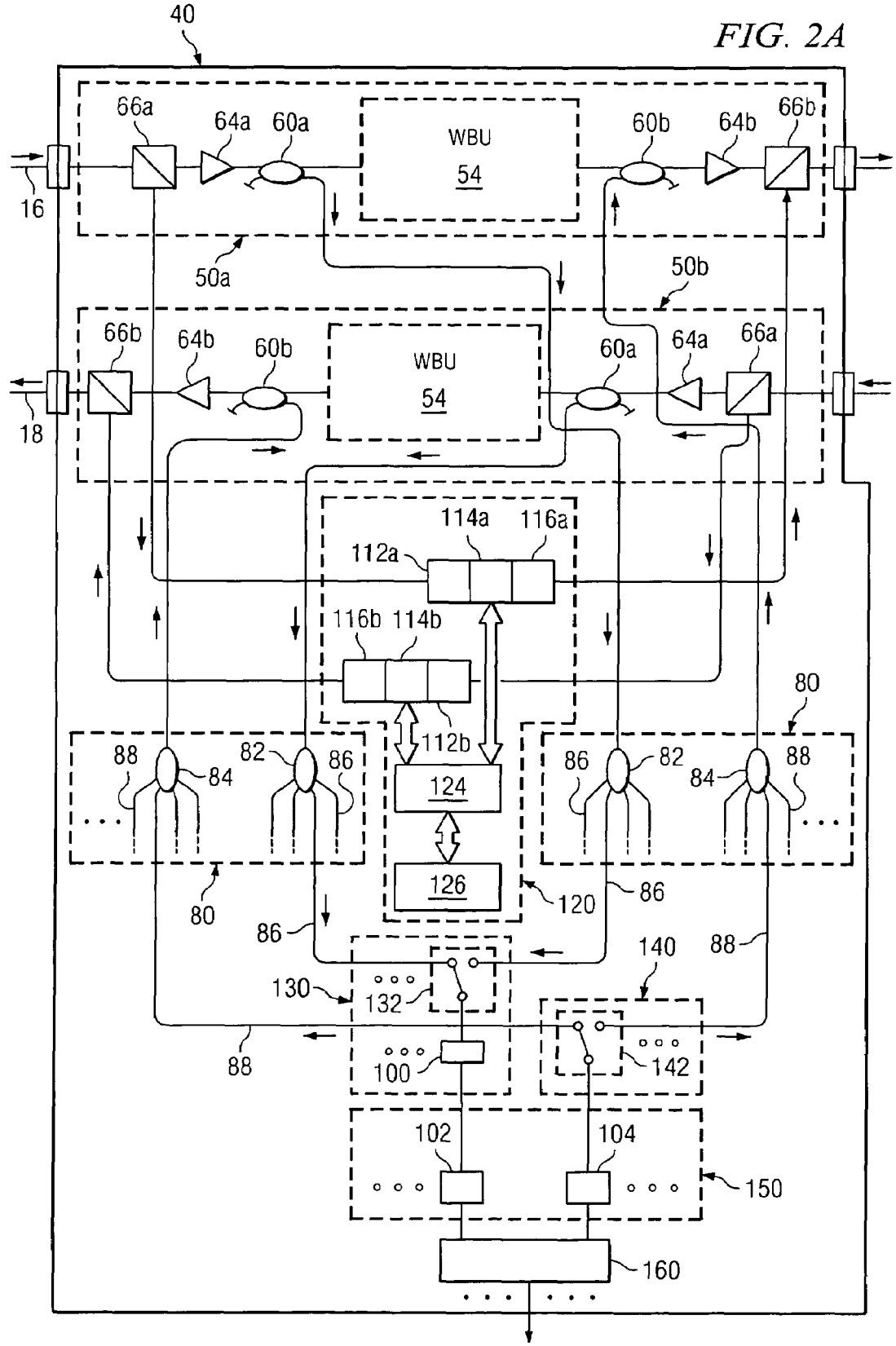
FIGS. 2A-2C are block diagrams illustrating particular embodiments of nodes that may be utilized in an optical network implementing light-trails.
Figure 2B:
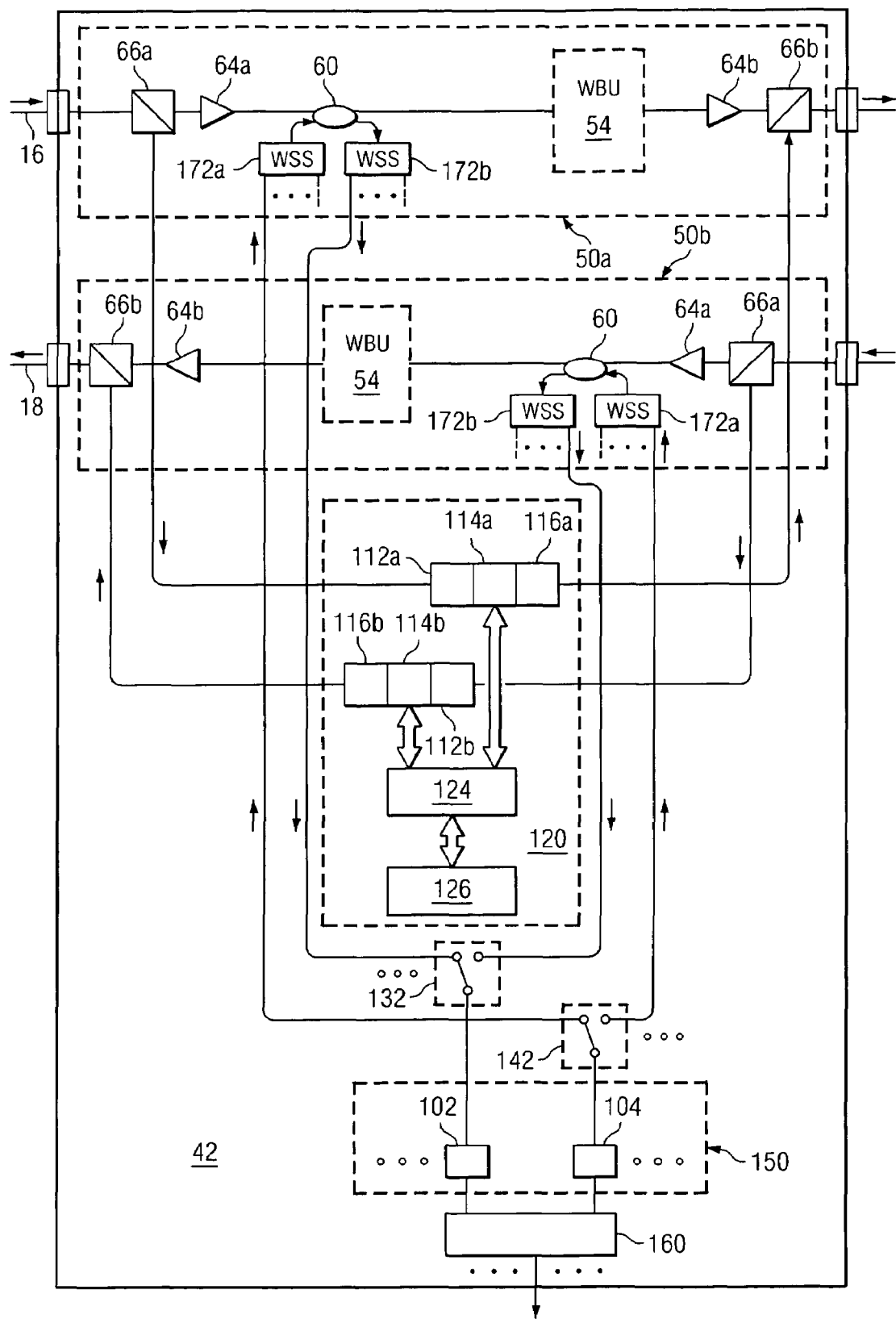
Figure 2C:
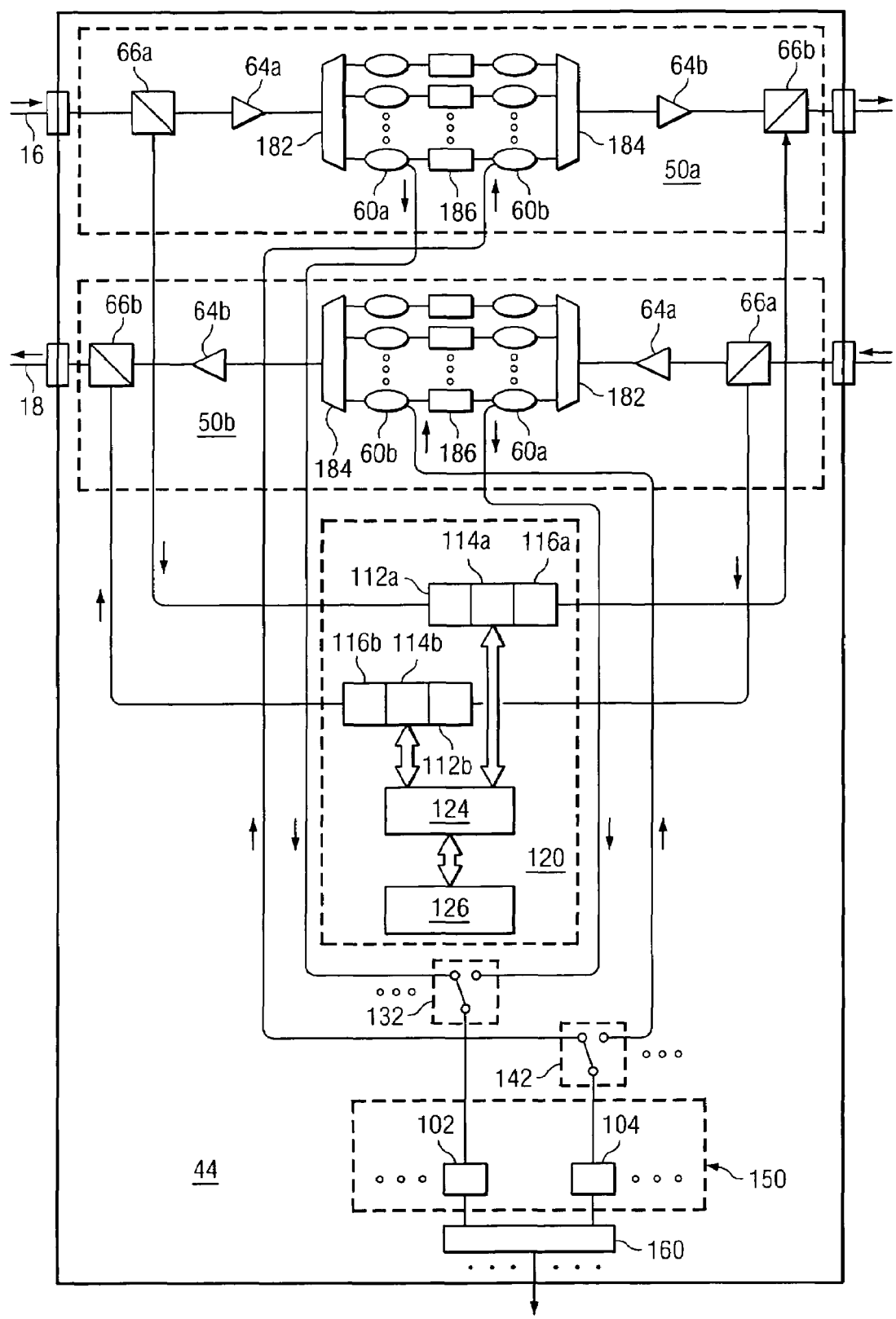

Nodes 14 that allow light-trail communication have specific characteristics that enable the nodes 14 to implement light-trails. For example, these characteristics include a drop and continue function (where traffic received by an element of the node is both dropped and forwarded, so as to allow the traffic to continue along the light-trail), passive adding of traffic by the node ("passive" in this context means the adding of traffic without using optical switches that use power, electricity, and/or moving parts), and the use of an out-of-band control channel (as opposed to control signals that are in-band with the data being communicated on the network 10). As described below, FIGS. 2A-2C illustrate particular embodiments of nodes 14 including these characteristics.

Referring again to FIG. 1, although a single light-trail 30 is illustrated, nodes 14 may establish light-trails on one or more wavelengths utilized by optical network 10 and multiple non-overlapping light-trails may exist at a particular time on a particular wavelength. To prevent optical interference caused by multiple nodes 14 transmitting simultaneously on a particular light-trail in optical network 10, nodes 14 may utilize particular techniques for sharing the light-trail, as described below. Therefore, there are two levels of "arbitration" associated with light-trails. The first level is the establishment and termination of light-trails to meet particular demands, as well as the "dimensioning" of light-trails (growing or shrinking the trails to meet particular demands). The second level of arbitration is the allocation of the use of the light-trail to nodes in the light-trail. Nodes may be allocated bandwidth according to defined rules or heuristics, predefined bandwidth allocation algorithms, "round robin" techniques (as discussed below), on a dynamic basis, and/or using any other suitable techniques.

Although FIG. 1 illustrates a particular embodiment and configuration of ring network 10, mesh, linear, or other suitable types of optical networks may be used in accordance with the present invention. In the illustrated embodiment, network 10 is an optical network in which a number of optical channels are carried over a common transmission media at different wavelengths. For example, network 10 may be a wavelength division multiplexed (WDM) network, a dense wavelength division multiplexed (DWDM) network, or any other suitable multi-channel network. Network 10 may represent all or a portion of a short-haul metropolitan network, a long-haul intercity network, or any other suitable network or combination of networks. Network 10 may include, as appropriate, a single uni-directional fiber, a single bi-directional fiber, or a plurality of uni- or bi-directional fibers.

Optical ring 20, in the illustrated embodiment, comprises a pair of uni-directional fibers, first fiber 16 and second fiber 18, transporting traffic in a counterclockwise and clockwise direction, respectively. Optical ring 20 optically couples the plurality of nodes 14a-14f, and optical traffic propagates between nodes 14 over optical ring 20. As used herein, "traffic" means information transmitted, stored, or sorted in the network. Such traffic may comprise optical signals having at least one characteristic modulated to encode audio, video, textual, real-time, non-real-time and/or other suitable data. Modulation may be based on phase shift keying (PSK), intensity modulation (IM), and other suitable methodologies. Additionally, the information carried by this traffic may be structured in any suitable manner. Although the description below focuses on an embodiment of network 10 that communicates traffic on optical ring 20 in the form of optical frames, network 10 may be configured to communicate traffic structured in the form of frames, as packets, or in any other appropriate manner.

Using established light-trails, nodes 14 facilitate communication between a plurality of client devices (not shown) coupled to each node 14 through a plurality of client ports. As described in greater detail below, each node 14 may receive traffic from client devices coupled to that node 14 and add this traffic to optical ring 20 to the optical traffic propagating on optical ring 20. Each node 14 may also receive traffic from optical ring 20 and drop traffic destined for client devices of that node 14, such as personal computers (PCs), telephones, fax machines, hard drives, web servers, and/or any other appropriate communication device. Although FIG. 1, illustrates one embodiment of network 10 that includes a particular number of nodes 14, network 10 may include any appropriate number of nodes 14 configured in any appropriate manner.

In operation, nodes 14 generate optical traffic at one or more wavelengths based on electrical signals received by nodes 14 from client devices coupled to nodes 14 and add this optical traffic to optical traffic propagating on optical ring 20. Nodes 14 also receive and drop traffic propagating on optical ring 20 that is destined for one or more of its clients. For the purposes of this description, nodes 14 may "drop" traffic by transmitting a copy of the traffic to any appropriate components that are a part of or coupled to the relevant node 14. As a result, nodes 14 may drop traffic from optical ring 20 by transmitting the traffic to these components while allowing the traffic to continue to downstream components on optical ring 20. Each node 14 drops and electrically converts traffic received on particular wavelengths at which that node 14 is configured to receive traffic and either does not drop or discards traffic transmitted at other wavelengths. Once traffic is dropped from the optical ring 20, nodes 14 may provide optical-to-electrical conversion of the dropped traffic. Nodes 14 then extract, based on addressing information in the traffic, portions of this traffic destined for client devices coupled to that node 14. In certain embodiments, each node 14 comprises a switching element (not shown in FIG. 1) which may forward the traffic, or a portion thereof, to one or more of a plurality of client devices based on addressing information.

Since nodes 14 time-share a wavelength associated with a particular light-trail, the data flow patterns through a light-trail dominant network may be somewhat "bursty" in nature due to the interleaving of data streams from multiple nodes 14. However, client devices (typically, Layer-2 devices) associated with a node 14 expect that the optical layer will provide uninterrupted communication to the devices. Therefore, to facilitate an interface between the bursty optical layer (due to time sharing of the bandwidth of light-trails) and the continuous client layer, nodes 14 include a device called a burstponder. A burstponder is a device that allows a node 14 to time share a wavelength while creating an impression to client device of the node 14 that the wavelength is available on a seamless and continuous basis. Such a burstponder is described in further detail in conjunction with FIGS. 2A-2C.

Figure 3A:
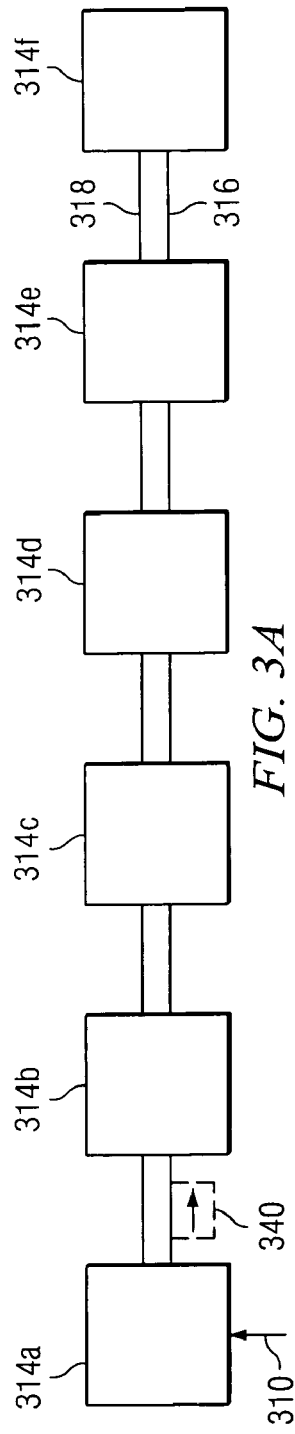
FIG. 3A-3C illustrate example operation of nodes of an optical network in establishing a light-trail.
Figure 3B:
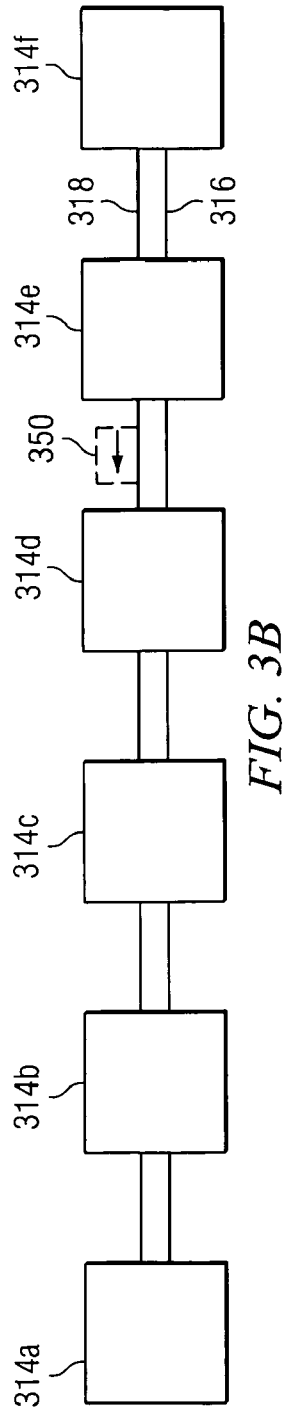
Figure 3C:
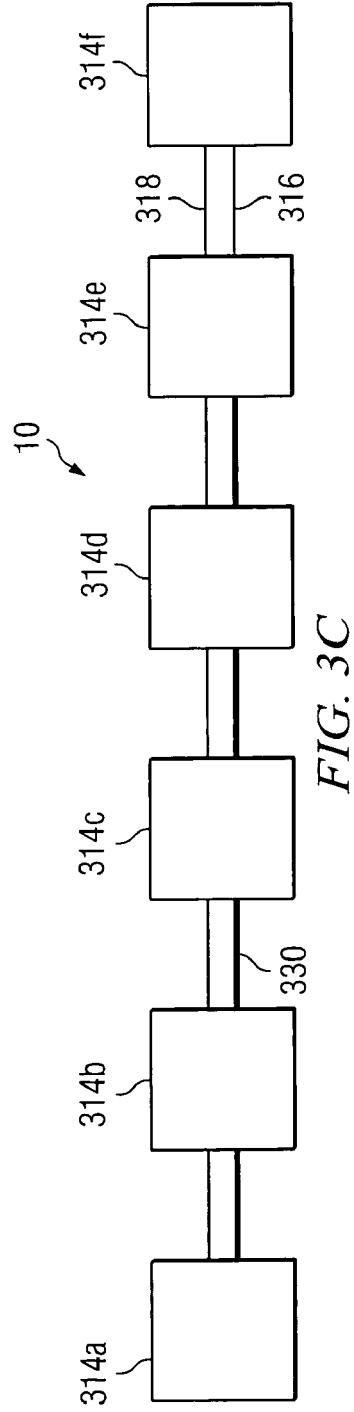

Additionally, nodes 14 may be configured to establish light-trail 30 and transmit or receive some or all optical traffic on light-trail 30. Light-trail 30 represents an optical path on a portion of fiber connecting any two or more components in optical network 10. Light-trail 30 is illustrated in FIG. 1 as a shaded portion of fiber 16. Once light-trail 30 is established, any of the nodes 14 connected to light-trail 30 may transmit optical traffic on light-trail 30 to nodes 14 located downstream from the transmitting node 14 in the direction traffic is propagating along light-trail 30. A particular node 14 may terminate or reconfigure light-trail 30 at any appropriate time. Additionally, as noted above, in particular embodiments, multiple light-trails may be established in optical ring 20, with each light-trail associated with a particular wavelength. Furthermore, multiple, non-overlapping light-trails may be associated with a common wavelength. The operation of a particular embodiment of optical network 10 in establishing a light-trail is illustrated in FIGS. 3A-3C.

As mentioned above, to coordinate the establishment and sharing of light-trails, optical network 10 supports an optical supervisory channel (OSC) or other out-of-band control channel on which control signals are exchanged between nodes 14 and/or other components of optical network 10. Nodes 14 may exchange control messages on the OSC to initiate and terminate light-trails and to manage use of established light-trails. In a particular embodiment, the OSC represents one or more wavelengths, among a plurality of wavelengths utilized by optical network 10, that are dedicated to control signals. Alternatively, the OSC may represent a separate fiber in optical ring 20 on which nodes 14 may exchange control signals. According to particular embodiments, control signals associated with a particular light-trail may be transmitted on the OSC in the direction of traffic on that light-trail, in a direction opposite to the direction of traffic on that light-trail, or in both directions on the OSC.

Use of light-trails may result in more efficient transmission of traffic between nodes 14. In particular embodiments, nodes 14 may be configured to use light-trails to transmit all traffic and may establish additional light-trails if the amount of traffic flowing on a particular light-trail exceeds a particular threshold, or if a particular node 14 is unable to transmit traffic (due to use of the light-trail by other nodes 14) that cannot be delayed. In general, however, nodes 14 may be configured to establish light-trails based on any appropriate criteria, factors, or considerations.

In particular embodiments of optical network 10, nodes 14 may share use of a light-trail through a "round robin" or "weighted round robin" system, as described below in FIGS. 4A and 4B. In other embodiments, a particular node 14 is granted use of an existing light-trail to transmit optical traffic to other nodes 14 based on a priority associated with that node 14. Thus, when more than one node 14 is attempting to transmit optical traffic on the same light-trail at the same time, an element of optical network 10 may determine which node 14 will be granted use of that light-trail based on a comparison of the priorities of the competing nodes 14. These techniques, or other suitable techniques for sharing a light-trail, may result in more efficient communication of information as transmission by certain nodes 14 or the transmission of certain information may be given priority over other transmissions, allowing, for example, particular nodes 14 to satisfy minimum quality of service (QoS) requirements for their transmissions.

FIGS. 2A-2C are block diagrams illustrating particular embodiments of nodes that may be utilized in an optical network implementing light-trails. As an example, these nodes may be used as nodes 14 in the example ring network 10 of FIG. 1 or may used as nodes in any other type of network to implement light-trails (for the purposes of the discussion below, the nodes illustrated in FIGS. 2A-2C will be described as if they are nodes 14 coupled to network 10 of FIG. 1).

FIG. 2A is a block diagram illustrating a particular embodiment of a node 40 for use in implementing light-trails. As shown, node 40 includes transport elements 50*a* and 50*b*, distributing/combining elements 80*a* and 80*b*, a managing element 120, a drop element 130, an add element 140, a burstponder 150, and a switching element 160. Transport elements 50 add traffic to and drop traffic from fibers 16 and 18. More specifically, transport elements 50 may generate one or more copies of optical signals propagating on fibers 16 and 18 for communication of particular portions of the traffic carried in these optical signals to devices coupled to node 40. Additionally, transport elements 50 may include components appropriate to add traffic generated by node 40 or received from client devices of node 40 to fibers 16 and 18. For example, in the illustrated embodiment, each transport element 50 includes a coupler 60*a* which splits traffic received by transport elements 50 into two copies and forwards one copy of the traffic to drop element 130, while forwarding the other copy along the relevant fiber. Furthermore, each transport element 50 includes a coupler 60*b* which adds traffic received from add element 140 to traffic already propagating on the associated fiber. Although two couplers 60*a* and 60*b* are illustrated in each transport element 50, particular embodiments may include a single coupler that both adds and drops traffic. Such a single coupler may be used, as an example, in particular embodiments which do not include a wavelength blocking unit 54 (as is described below).

Each transport element 50 also includes, in the illustrated embodiment, a wavelength blocking unit (WBU) 54 configured to terminate particular wavelengths of traffic propagating on fibers 16 and 18. As a result, traffic that has already been received by its intended destination or destinations may be terminated at a subsequent node 40. Furthermore, WBU 54 may be used to isolate a light-trail, as described below. Although shown as a functional block in FIG. 2A, WBU 54 may represent and/or include suitable components configured in any appropriate manner to provide the functionality of dynamically blocking certain wavelengths and passing other wavelengths. As one example, WBU 54 may represent a wavelength-selective switch (WSS) operable to output any particular wavelength, or set of wavelengths, received at the input of WBU 54 on the output of WBU 54.

As another example, WBU 54 may represent a structure that includes an optical demultiplexer and an optical multiplexer connected by a series of switches. In such an embodiment, the demultiplexer may demultiplex the signal into its constituent channels. The switches may then be dynamically configured to selectively terminate or forward each channel to the multiplexer based on control signals received by each switch. The channels that are forwarded by the switches are received by the multiplexer, multiplexed into a WDM optical signal, and forwarded to downstream elements.

As another example, WBU 54 may represent a collection of tunable filters tuned to allow only traffic on appropriate wavelengths to be forwarded on fibers 16 or 18. In such an embodiment, a coupler of WBU 54 may receive optical signals input to WBU 54 and split the optical signals into a plurality of copies, transmitting each of these copies to a particular tunable filter. Each tunable filter may then selectively pass traffic propagating at a particular wavelength or within a particular range of wavelengths and block traffic propagating at all other wavelengths. Each tunable filter then forwards the passed traffic propagating at the associated wavelength or wavelengths to an output coupler of WBU 54. The output coupler then combines the output of the various tunable filters to produce an output WDM optical signal and forwards the output optical signal to components downstream from WBU 54.

Transport elements 50 may also include appropriate components to allow node 40 to transmit and receive information pertaining to the status and operation of fibers 16 and 18, other nodes, any light-trails established in network 10, or any other appropriate elements or functionality of optical network 10. In particular, each node 40 may include elements to allow node 40 to receive and transmit messages on an optical supervisory channel (OSC). In the illustrated embodiment, each transport element 50 includes an OSC ingress filter 66a that processes an ingress optical signal from its respective fiber 16 or 18. Each OSC filter 66a filters the OSC signal from the optical signal and forwards the OSC signal to a respective OSC receiver 112. Each OSC filter 66a also forwards the remaining optical signal to other components of transport element 50. Each transport element 50 also includes an OSC egress filter 66b that adds an OSC signal from an associated OSC transmitter 116 to the optical signal propagating on the associated fiber 16 or 18 and forwards the combined signal to elements located downstream on fiber 16 or 18. The added OSC signal may be locally-generated data or may be OSC data received by node 40 and passed through managing element 120.

Distributing/combining elements 80 may each comprise a drop signal splitter 82 and an add signal combiner 84. Splitters 82 may each comprise a coupler connected to one optical fiber ingress lead and a plurality of optical fiber egress leads which serve as drop leads 86. Each drop lead 86 may be connected to a drop element 130 associated with a particular local port of node 40. Although the illustrated embodiment shows a splitter 82 coupled to one drop lead 86, splitter 82 may be coupled to any appropriate number of drop leads 86.

Splitter 82 may, in general, represent any appropriate component or collection of components capable of splitting the optical signal received by splitter 82 into a plurality of copies each to be propagated on a particular drop lead 86. In particular embodiments in which four drop leads 86 are implemented, splitters 82 may each specifically comprise a 2×4 optical coupler, where one ingress lead is terminated, the other ingress lead is coupled to a coupler 60 via a fiber segment, and the four egress leads are used as drop leads 86.

Combiners 84 similarly may each comprise a coupler with multiple optical fiber ingress leads, which serve as add leads 88, and one optical fiber egress lead. Each add lead 88 may be connected to an add element 140 associated with a particular port of node 40. In particular embodiments in which combiner 84 is coupled to four ingress leads, combiner 84 may comprise a 2×4 optical coupler, where one egress lead is terminated, the other egress lead is coupled to a coupler via a fiber segment, and the four ingress leads comprise add leads 88. As with splitter 82, the described components of combiner 84 may be replaced by any suitable component or collection of components for combining a plurality of optical signal into a single output signal. Although the illustrated embodiment shows a combiner 84 coupled to one add lead 88, combiner 84 may be coupled to any appropriate number of add leads 88.

Drop elements 130 selectively couple ports of burstponder 150 to outputs of distributing/combining elements 80 through filters 100, which are each capable of isolating traffic in a different wavelength from each copy of the optical signal created by splitter 82. As a result, drop elements 130 may output particular wavelengths of traffic from fibers 16 and 18 to particular ports of burstponder 150. Add elements 140 also couple particular ports of burstponder 150 to combining/distributing elements 80. Drop element 130 and add element 140 may include, respectively, a drop switch 132 and an add switch 142, or other suitable components, to selectively connect associated ports of burstponder 150 to fiber 16 or 18. Alternatively, add switch 142 may be replaced by a coupler which can split a signal from the associated transmitter 104 and by a pair of shutters (one for each branch of the split signal) that can control whether the signal is added to fiber 16, fiber 18, or both fibers 16 and 18. As a result, drop element 130 and add element 140 may be utilized to support protection switching for node 40. Alternatively, particular embodiments of drop element 130 and add element 140 may omit drop switch 132 and add switch 142, respectively, and couple different ports of burstponder 150 to each fiber 16 and 18. Moreover, in particular embodiments, node 40 may include multiple drop elements 130 and/or add elements 140, each associated with a particular wavelength supported by optical network 10.

Burstponder 150 converts bursty or time-interleaved optical traffic received from drop elements 130 to seamless and continuous electrical traffic for delivery to client devices of node 40 and converts electrical traffic received from client devices to optical traffic for transmission on fiber 16 or 18 in bursts when the node 40 has use of the light-trail. As described above, burstponder 150 allows node 40 to time share a light-trail while creating an impression to client devices of the node 40 that the wavelength is available on a seamless and continuous basis. Burstponder 150 may include any appropriate number of receivers 102 operable to receive optical signals and generate electrical signals based on these optical signals and transmitters 104 operable to receive electrical signals and to transmit optical signals based on these electrical signals. Depending on the configuration of node 40, each of these receivers 102 and transmitters 104 may be fixed or tunable. Each of these receivers 102 and transmitters 104 may be a burst-mode receiver or transmitter that has burst mode clock and data recovery operation. As described below, switching element 160 may represent any appropriate component or components for transmitting electrical traffic output by burstponder 150 to appropriate client devices of node 40 and for transmitting electrical traffic received from client devices of node 40 to appropriate ports of burstponder 150 (such ports may each be associated with a particular transmitter 104). In a particular embodiment, switching element 160 comprises a Layer-2 (L2) switch. Although shown as part of node 40 in FIG. 2A, switching element 160 may be physically separate from node 40.

Managing element 120 may comprise OSC receivers 112, OSC interfaces 114, OSC transmitters 116, and an element management system (EMS) 124. Each OSC receiver 112, OSC interface 114, and OSC transmitter 116 set forms an OSC unit for one of the fibers 16 or 18 in the node 40. The OSC units receive and transmit OSC signals for the EMS 124. EMS 124 may be communicably coupled to a network management system (NMS) 126. NMS 126 may reside within node 40, in a different node, or external to all nodes 40.

EMS 124 and/or NMS 126 may comprise logic encoded in media for performing network and/or node monitoring, failure detection, protection switching and loop back or localized testing functionality of the optical network 10. In a particular embodiment, EMS 124 and/or NMS 126 generate, transmit, receive, and/or process control messages associated with the establishment, operation, and termination of light-trails. Any logic included in EMS 124 or NMS 126 may comprise software encoded in a disk or other computer-readable medium, such as memory, and/or instructions encoded in an application-specific integrated circuit (ASIC), field programmable gate array (FPGA), or other processor or hardware. It will be understood that functionality of EMS 124 and/or NMS 126 may be performed by other components of the network and/or be otherwise distributed or centralized. For example, operation of NMS 126 may be distributed to the EMS 124 of nodes 40, and the NMS 126 may thus be omitted as a separate, discrete element. Similarly, the OSC units may communicate directly with NMS 126 and EMS 124 omitted.

EMS 124 monitors and/or controls elements within node 40. For example, EMS 124 may control operation of transmitters 104, receivers 102, and WBU 54 to facilitate the establishment and use of light-trails. In the illustrated embodiment, EMS 124 receives an OSC signal from each of fiber 16 and 18 in an electrical format via an OSC receiver 112 associated with that fiber (the OSC receiver 112 obtains the signal via an OSC filter 66a). This OSC signal may include one or more of multiple types of control messages, as described above. EMS 124 may process the signal, forward the signal and/or loop-back the signal. EMS 124 may be operable to receive the electrical signal and resend the OSC signal via OSC transmitter 116 and OSC filter 66b to the next node on fiber 16 or 18, adding, if appropriate, locally-generated control messages or other suitable information to the OSC.

NMS 126 collects information from all nodes 40 in optical network 10 and is operable to process control messages transmitted by nodes 40 to manage particular aspects of the use of light-trails. For example, in a particular embodiment, NMS 126 may be operable to select a particular node 40 for transmission on a light-trail when multiple nodes 40 request use of the light-trail. As noted above, NMS 126 may represent a portion or all of EMSs 124 of all nodes 40 in optical network 10. Moreover, although the description below describes particular embodiments of optical network 10 in which functionality is divided between NMS 126 and EMSs 124 in a particular manner, in alternative embodiments the described functionality may be distributed between NMS 126 and EMSs 124 in any appropriate manner. Additionally, although NMS 126 and EMS 124, as shown in FIG. 2A, represent, at least in part, components located within node 40, some or all of NMS 126 and/or EMS 124 may be located external to nodes 40.

Although not shown in FIG. 2A, node 40 may also include a memory operable to store code associated with EMS 124, NMS 126, and/or other components of optical network 10, information specifying a wavelength assignment scheme utilized for protection traffic on optical network 10, and/or any other suitable information used during operation of optical network 10. Memory may represent one or more memory devices that are located within node 40 or that are physically separate from node 40. Additionally, memory may be shared with other components of optical network 10 including other nodes 40. Memory may represent computer disks, a hard disk memory, random access memory (RAM), read-only memory (ROM), or any other suitable storage media.

In operation, transport elements 50 receive traffic from fibers 16 and 18. In the illustrated embodiment, traffic received from fibers 16 and 18 includes an OSC signal, and transport elements 50 are operable to add and drop the OSC signal to and from fibers 16 and 18. More specifically, each OSC ingress filter 66a processes an ingress optical signal from its respective fiber 16 or 18. OSC ingress filter 66a filters the OSC signal from the optical signal and forwards the OSC signal to its respective OSC receiver 112. Each OSC ingress filter 66a also forwards the remaining transport optical signal to the associated amplifier 64. Amplifier 64 amplifies the signal and forwards the signal to its associated coupler 60a. It should be noted that all amplifiers associated with the node embodiments described in conjunction with FIGS. 2A-2C may be omitted, depending on the circumstances.

EMS 124 may process control messages transmitted by other nodes 40 or other components of optical network 10 and adjust operation of node 40 in response. In particular, EMS 124 may reconfigure WBU 54, transmitters 104, filters 100, receivers 102, and/or any other appropriate element of node 40 in response to control messages received by EMS 124. As one example, EMS 124 may, in response to receiving a setup message, configure a WBU 54 of node 40 to allow traffic propagating at a particular wavelength to pass through WBU 54. As another example, EMS 124 may, in response to receiving an intimation message from another node 40, tune a particular filter 100 and/or a particular receiver 102 to allow node 40 to receive optical traffic on a particular wavelength associated with a light-trail.

Furthermore, EMS 124 may also generate control messages for transmission to other nodes 40 or other components of optical network 10. For example, EMS 124 may generate electronic signals associated with setup messages, intimation messages, request messages, and/or any other appropriate type of control messages and communicate these electronic signals to OSC transmitter 116 to transmit optical signals representing the appropriate control message to the associated transport element 50. These control messages may then be added to the optical traffic on fiber 16 or 18, as appropriate.

Meanwhile, coupler 60a splits the signal from the amplifier 64 into two copies: a through signal that is forwarded to WBU 54 and a drop signal that is forwarded to distributing/combining element 80. Distributing/combining element 80 may then split the drop signal into one or more copies and forward the copies of the drop signal to one or more drop elements 130. In a particular embodiment, each drop element 130 includes a drop switch 132 that allows drop element 130 to selectively couple a drop signal from either fiber 16 or fiber 18 to a filter 100 included in that drop element 130. Additionally, filter 100 may be tuned to a particular wavelength. As a result, in such an embodiment, traffic propagating at a particular wavelength on the selected fiber is output to burstponder 150.

Burstponder 150 receives the output of a plurality of drop elements 130. A receiver 102 in burstponder 150 that is associated with each drop element 130 converts the optical signal received from that drop element 130 into electrical traffic. The electrical traffic generated by each receiver 102 is then output to switching element 160. In particular embodiments of node 40, burstponder 150 may include buffers (not shown) and the output of receivers 102 may be stored in one or more buffers to be transmitted to switching element 160 at an appropriate time.

Switching element 160 receives seamless and continuous electrical traffic output by burstponder 150 and switches this electrical traffic in any appropriate manner to facilitate transmission of this electrical traffic to an appropriate client device of node 40. The electrical traffic received by switching element 160 from burstponder 150 may include information in the form of packets, frames, and/or datagrams, and/or information structured in any other appropriate form. For example, in a particular embodiment, switching element 160 may represent an L2 switch and may receive electrical signals from burstponder 150 in the form of packets.

Switching element 160 also receives electrical traffic from client devices coupled to switching element 160 and switches this electrical traffic to communicate the electrical traffic to an appropriate port of burstponder 150. The electrical traffic received by switching element 160 from the client devices may include information in the form of packets, frames, and/or datagrams, and/or information structured in any other appropriate form. As noted above, switching element 160 may represent an L2 switch and may receive electrical traffic from the client devices in the form of packets. In such an embodiment, the L2 switch may switch each packet, based on a header included in that packet, to deliver the packet to a port of the L2 switch coupled to an appropriate port of burstponder 150.

Burstponder 150 receives electrical traffic from switching element 160 on one or more ports of burstponder 150. Certain ports of burstponder 150 are configured to receive electrical traffic from switching element 160, and each of these ports may pass the received electrical traffic to a particular transmitter 104 in burstponder 150 associated with that port. Each transmitter 104 may then generate a burst of optical traffic from the electrical traffic received from switching element 160 and transmit that optical traffic to a particular add element 140 associated with that transmitter 104. In particular embodiments, EMS 124 may tune transmitters 104 of burstponder 150, and transmitters 104 may generate optical traffic at a particular wavelength determined by EMS 124. In other embodiments, transmitters 104 transmit at a fixed wavelength. Additionally, burstponder 150 may include one or more buffers that store electrical traffic from switching element 160 to be input to transmitter 104 at an appropriate time (such as when the node is granted use of a light-trail). Such buffering is useful since a node 40 may not be able to transmit traffic when it is received because another node 40 is using a shared light-trail.

Optical traffic output by transmitters 104 of burstponder 150 is then received by an appropriate add element 140 associated with the transmitter 104 that generated the optical traffic. Each add element 140 may include an add switch 142 capable of selectively coupling that add element to a combiner 84 in a distributing/combining element 80 associated with either fiber 16 or 18. As a result, optical traffic generated by transmitters 104 of burstponder 150 may be added to an appropriate fiber 16 or 18 based on the circumstances. For example, particular embodiments of node 40 may support protection switching and add switch 142 may be reconfigured in response to the detection of a fault on one fiber to transmit optical traffic on the other fiber. The appropriate distributing/combining element 80 then forwards the optical traffic received from burstponder 150 to the coupler 60b of the associated fiber.

Returning to the operation of couplers 60a, in addition to forwarding the drop signal as described above, each coupler 60a forwards the through signal to its respective WBU 54. WBUs 54 receive the optical signal and selectively terminate or forward channels of the through signal. In a particular embodiment of node 40, EMS 124 may control operation of WBU 54 to establish a light-trail on a specified wavelength on a particular fiber 16 or 18 in response to a setup message received from a convener node 40a. In particular, if node 40 represents a node on the interior of the requested light-trail, EMS 124 may configure WBU 54 to allow optical signals propagating at the specified wavelength on the relevant fiber to pass through WBU 54. If node 40 represents a node 40 at the beginning or end of a light-trail, EMS 124 may configure WBU 54 to block optical signals propagating at the specified wavelength on the relevant fiber. In this way, traffic transmitted by a node in a light-trail does not leave the light-trail. Because of this, multiple non-overlapping light-trails may be formed using the same wavelength in the same fiber.

In particular embodiments, however, WBUs 54 may be omitted from the node. In such embodiments, the node will be unable to block the transmission of traffic through the node (since there would be nothing to terminate any of the wavelengths of the copy of the optical signal forwarded from couplers 60a). Therefore, in such embodiments, multiple light-trails may not be formed in the same wavelength. However, in many network topologies, such as ring networks, at least one such node (or some other device in the network) must be able to stop the propagation of optical signals added from the nodes around the network to prevent interference. As an example, otherwise traffic being added in a particular wavelength at a node will propagate around the network and return to the adding node, where it will interfere with new traffic being added in that wavelength. Therefore, particular embodiments may include one or more nodes that include a WBU (such as nodes 40) and one or more other nodes that do not include a WBU. If multiple nodes that include a WBU are used in such embodiments, it may be possible to create multiple light-trails in a single wavelength; however, the locations of these light-trails would be limited according to the number and placement of the nodes including the WBUs.

Returning to the operation of the illustrated node 40, each coupler 60b may subsequently combine the output of the associated WBU 54 with the traffic received from an associated combiner 84. After coupler 60b adds locally-derived traffic to the output of WBU 54, coupler 60b forwards the combined signal to the associated amplifier 64 and OSC egress filter 66b. Each OSC egress filter 66b adds an OSC signal from the associated OSC transmitter 116 to the combined optical signal and forwards the new combined signal as an egress transport signal to the associated fiber 16 or 18 of optical network 10.

FIG. 2B is a block diagram illustrating another embodiment of a node 42 for use in implementing light-trails. In this embodiment, couplers 60a and 60b and WBUs 54, and combining/distributing elements 80 of node 40 illustrated in FIG. 2A are replaced by a single coupler 60 and a number of WSSs 172. The other components of node 42 are similar to those of node 40. Coupler 60 and WSSs 172 are included in transport elements 50a and 50b of node 42. Transport elements 50 add traffic to and drop traffic from fibers 16 and 18. More specifically, coupler 60 of transport elements 50 generates two copies of an optical signal propagating on fibers 16 and 18. One copy is forwarded to a drop WSS 172b, which is operable to forward on particular portions of the traffic carried in the optical signal to one or more drop switches 132 for delivery to client devices coupled to node 42, as described below. The other copy is forwarded to a WBU 54.

Each transport element 50 also includes an add WSS 172a that is used to add traffic generated by node 42 or received from client devices of node 42 to fibers 16 and 18. Add WSS 172a receives traffic from one or more add switches 142 and adds this traffic onto the associated ring 16 or 18. Add WSS 172a combines the received add signals and forwards the combined add signals to coupler 60, which adds the combined signal to the associated ring 16 or 18. Although a single coupler 60 is illustrated in each transport element 50, particular embodiments may include a separate add coupler and a separate drop couplers (similar to couplers 60a and 60b of node 40).

Each transport element 50 also includes a wavelength blocking unit (WBU) 54 configured to terminate particular wavelengths of traffic propagating on fibers 16 and 18. As a result, traffic that has already been received by its intended destination or destinations may be terminated at node 42. Furthermore, WBU 54 may be used to isolate a light-trail, as described below. Although shown as a functional block in FIG. 2B, WBU 54 may represent and/or include suitable components configured in any appropriate manner to provide the functionality of dynamically blocking certain wavelengths and passing other wavelengths. Examples of particular WBUs 54 that may be used are described in conjunction with FIG. 2A. As one example, WBU 54 may be another WSS (in this case, a WSS that may be configured to switch particular wavelengths that need termination to one or more terminated (or unconnected) ports of the WSS.

As with node 40, transport elements 50 of node 42 may also include appropriate components to allow node 42 to transmit and receive information pertaining to the status and operation of fibers 16 and 18, other nodes, any light-trails established in network 10, or any other appropriate elements or functionality of optical network 10. In particular, each node 42 may include elements to allow node 42 to receive and transmit messages on an optical supervisory channel (OSC). As with transport elements 50 of node 40, each transport element 50 of node 42 includes an OSC ingress filter 66a that processes an ingress optical signal from its respective fiber 16 or 18. Each OSC filter 66a filters the OSC signal from the optical signal and forwards the OSC signal to a respective OSC receiver 112. Each OSC filter 66a also forwards the remaining optical signal to other components of transport element 50. Each transport element 50 also includes an OSC egress filter 66b that adds an OSC signal from an associated OSC transmitter 116 to the optical signal propagating on the associated fiber 16 or 18 and forwards the combined signal to elements located downstream on fiber 16 or 18. The added OSC signal may be locally-generated data or may be OSC data received by node 42 and passed through managing element 120.

Node 42 also includes one or more drop switches 132 and one or more add switches 142. Each drop switch 132 selectively couples an output port of one of the two drop WSSs 172b (associated with rings 16 and 18, respectively) to an associated port of burstponder 150. Similarly, each add switch 142 selectively couples a particular port of burstponder 150 to an associated input port of one of the two add WSSs 172a. Alternatively, add switch 142 may be replaced by a coupler which can split a signal from the associated transmitter 104 and by a pair of shutters (one for each branch of the split signal) that can control whether the signal from the transmitter is added to fiber 16, fiber 18, or both fibers 16 and 18. As a result, drop switch 132 and add switch 142 may be utilized to support protection switching for node 42. Alternatively, particular embodiments of may omit drop switch 132 and add switch 142 and may couple different ports of burstponder 150 to each WSS 172a and drop WSS 172b.

Burstponder 150 converts bursty or time-interleaved optical traffic received from a drop WSS 172b (via drop switches 132) to seamless and continuous electrical traffic for delivery to client devices of node 42 and converts electrical traffic received from client devices to optical traffic for transmission on fiber 16 or 18 in bursts via an associated add WSS 172a when the node 40 has use of the light-trail. As described above, burstponder 150 allows node 42 to time share a light-trail while creating an impression to client devices of the node 42 that the wavelength is available on a seamless and continuous basis (although at slower line rate). Burstponder 150 may include any appropriate number of receivers 102 operable to receive optical signals and generate electrical signals based on these optical signals and transmitters 104 operable to receive electrical signals and to transmit optical signals based on these electrical signals. Depending on the configuration of node 42, each of these receivers 102 and transmitters 104 may be fixed or tunable. Each of these receivers 102 and transmitters 104 may be a burst-mode receiver or transmitter that has burst mode clock and data recovery operation.

As described below, switching element 160 may represent any appropriate component or components for transmitting electrical traffic output by burstponder 150 to appropriate client devices of node 42 and for transmitting electrical traffic received from client devices of node 42 to appropriate ports of burstponder 150 (such ports may each be associated with a particular transmitter 104). In a particular embodiment, switching element 160 comprises a Layer-2 (L2) switch. Although shown as part of node 42 in FIG. 2B, switching element 160 may be physically separate from node 42 in other embodiments.

As with node 40, node 42 includes a managing element 120 that comprises OSC receivers 112, OSC interfaces 114, OSC transmitters 116, and an element management system (EMS) 124. Each OSC receiver 112, OSC interface 114, and OSC transmitter 116 set forms an OSC unit for one of the fibers 16 or 18 in the node 42. The OSC units receive and transmit OSC signals for the EMS 124. EMS 124 may be communicably coupled to a network management system (NMS) 126. NMS 126 may reside within node 42, in a different node, or external to all nodes 40.

As described above, EMS 124 and/or NMS 126 may comprise logic encoded in media for performing network and/or node monitoring, failure detection, protection switching and loop back or localized testing functionality of the optical network 10. In a particular embodiment, EMS 124 and/or NMS 126 generate, transmit, receive, and/or process control messages associated with the establishment, operation, and termination of light-trails. EMS 124 monitors and/or controls elements within node 42. NMS 126 collects information from all nodes 40 in optical network 10 and is operable to process control messages transmitted by nodes 40 to manage particular aspects of the use of light-trails.

Although not shown in FIG. 2B, node 42 may also include a memory operable to store code associated with EMS 124, NMS 126, and/or other components of optical network 10, information specifying a wavelength assignment scheme utilized for protection traffic on optical network 10, and/or any other suitable information used during operation of optical network 10. Memory may represent one or more memory devices that are located within node 42 or that are physically separate from node 42. Additionally, memory may be shared with other components of optical network 10 including other nodes 40. Memory may represent computer disks, a hard disk memory, random access memory (RAM), read-only memory (ROM), or any other suitable storage media.

In operation, transport elements 50 receive traffic from fibers 16 and 18. In the illustrated embodiment, traffic received from fibers 16 and 18 includes an OSC signal, and transport elements 50 are operable to add and drop the OSC signal to and from fibers 16 and 18. More specifically, each OSC ingress filter 66a processes an ingress optical signal from its respective fiber 16 or 18. OSC ingress filter 66a filters the OSC signal from the optical signal and forwards the OSC signal to its respective OSC receiver 112. Each OSC ingress filter 66a also forwards the remaining transport optical signal to the associated amplifier 64. Amplifier 64 amplifies the signal and forwards the signal to its associated coupler 60.

EMS 124 may process control messages transmitted by other nodes 42 or other components of optical network 10 and adjust operation of node 42 in response. In particular, EMS 124 may reconfigure WBU 54, transmitters 104, receivers 102, and/or any other appropriate element of node 42 in response to control messages received by EMS 124. As one example, EMS 124 may, in response to receiving a setup message, configure a WBU 54 of node 42 to allow traffic propagating at a particular wavelength to pass through WBU 54. Furthermore, EMS 124 may also generate control messages for transmission to other nodes 42 or other components of optical network 10. For example, EMS 124 may generate electronic signals associated with setup messages, intimation messages, request messages, and/or any other appropriate type of control messages and communicate these electronic signals to OSC transmitter 116 to transmit optical signals representing the appropriate control message to the associated transport element 50. These control messages may then be added to the optical traffic on fiber 16 or 18, as appropriate.

Meanwhile, coupler 60 splits the signal from the amplifier 64 into two copies: a through signal that is forwarded to WBU 54 and a drop signal that is forwarded to WSS 172b. WSS 172b is operable to switch traffic in one or more wavelengths of the optical signal received from coupler 60 to one or more of its output ports. For example, each output port of WSS 172b may be associated with a particular wavelength. The output port of each WSS 172a may be selectively coupled (via a drop switch 132) to a port of burstponder 150 that is associated with that wavelength. In this manner, traffic in particular wavelengths of the dropped optical signal may be forwarded to burstponder 150.

Burstponder 150 receives particular wavelengths that are output from a WSS 172b (which WSS 172b depends on the position of each drop switch 132). A receiver 102 in burstponder 150 that is associated with each output port of drop WSS 172b receives and converts the optical traffic received from that output port into electrical traffic. The electrical traffic generated by each receiver 102 is then output to switching element 160. In particular embodiments of node 42, burstponder 150 may include buffers and the output of receivers 102 may be stored in one or more buffers to be transmitted to switching element 160 at an appropriate time.

Switching element 160 receives seamless and continuous electrical traffic output by burstponder 150 and switches this electrical traffic in any appropriate manner to facilitate transmission of this electrical traffic to an appropriate client device of node 42. The electrical traffic received by switching element 160 from burstponder 150 may include information in the form of packets, frames, and/or datagrams, and/or information structured in any other appropriate form. For example, in a particular embodiment, switching element 160 may represent an L2 switch and may receive electrical signals from burstponder 150 in the form of packets.

Switching element 160 also receives electrical traffic from client devices coupled to switching element 160 and switches this electrical traffic to communicate the electrical traffic to an appropriate port of burstponder 150. The electrical traffic received by switching element 160 from the client devices may include information in the form of packets, frames, and/or datagrams, and/or information structured in any other appropriate form. As noted above, switching element 160 may represent an L2 switch and may receive electrical traffic from the client devices in the form of packets. In such an embodiment, the L2 switch may switch each packet, based on a header included in that packet, to deliver the packet to a port of the L2 switch coupled to an appropriate port of burstponder 150.

Burstponder 150 receives electrical traffic from switching element 160 on one or more ports of burstponder 150. Certain ports of burstponder 150 are configured to receive electrical traffic from switching element 160, and each of these ports may pass the received electrical traffic to a particular transmitter 104 in burstponder 150 associated with that port. Each transmitter 104 may then generate a burst of optical traffic from the electrical traffic received from switching element 160 and transmit that optical traffic to one of the add WSSs 172a (depending upon the position of add switches 142). In particular embodiments, EMS 124 may tune transmitters 104 of burstponder 150, and transmitters 104 may generate optical traffic at a particular wavelength determined by EMS 124. In other embodiments, transmitters 104 transmit at a fixed wavelength. Additionally, burstponder 150 may include one or more buffers that store electrical traffic from switching element 160 to be input to transmitter 104 at an appropriate time (such as when the node is granted use of a light-trail). Such buffering is useful since a node 42 may not be able to transmit traffic when it is received because another node 42 is using a shared light-trail.

Optical traffic output by transmitters 104 of burstponder 150 is then received by an appropriate add WSS 172a (depending upon the position of the associated add switch 142). As a result, optical traffic generated by transmitters 104 of burstponder 150 may be added to an appropriate fiber 16 or 18. For example, particular embodiments of node 42 may support protection switching and add switch 142 may be reconfigured in response to the detection of a fault on one fiber to transmit optical traffic on the other fiber. The appropriate add WSS 172a then forwards the optical traffic received from burstponder 150 to the coupler 60 of the associated fiber.

Returning to the operation of coupler 60, in addition to forwarding the drop signal as described above, each coupler 60 forwards the through signal to its respective WBU 54 (this through signal may also include any locally-derived traffic added at coupler 60 by WSS 172a). As with node 40, WBUs 54 receive the optical signal and selectively terminate or forward channels of the through signal. In a particular embodiment of node 42, EMS 124 may control operation of WBU 54 to establish a light-trail on a specified wavelength on a particular fiber 16 or 18 in response to a setup message received from a convener node 42a. In particular, if node 42 represents a node on the interior of the requested light-trail, EMS 124 may configure WBU 54 to allow optical signals propagating at the specified wavelength on the relevant fiber to pass through WBU 54. If node 42 represents a node 42 at the beginning or end of a light-trail, EMS 124 may configure WBU 54 to block optical signals propagating at the specified wavelength on the relevant fiber. In this way, traffic transmitted by a node in a light-trail does not leave the light-trail. Because of this, multiple non-overlapping light-trails may be formed using the same wavelength in the same fiber. As described above, in particular embodiments, WBUs 54 may be omitted one or more nodes (and the same caveats apply equally here).

The output of WBU 54 is forwarded to the associated amplifier 64 and OSC egress filter 66b. Each OSC egress filter 66b adds an OSC signal from the associated OSC transmitter 116 to the combined optical signal and forwards the new combined signal as an egress transport signal to the associated fiber 16 or 18 of optical network 10.

FIG. 2C is a block diagram illustrating yet another embodiment of a node 44 for use in implementing light-trails. In this embodiment, couplers 60a and 60b, WBUs 54, and combining/distributing elements 80 of node 40 illustrated in FIG. 2A are replaced by a demultiplexer 182 and a multiplexer 184, as well as a plurality of drop couplers 60a, add couplers 60b, and switches 186 coupled between demultiplexer 182 and multiplexer 184. The other components of node 44 are similar to those of node 40. Demultiplexer 182, multiplexer 184, drop couplers 60a, add couplers 60b, and switches 186 are included in transport elements 180a and 180b of node 44. Transport elements 180 add traffic to and drop traffic from fibers 16 and 18.

More specifically, demultiplexer 182 demultiplexes a received optical signal propagating on the associated fiber 16 and 18 into its constituent wavelengths. The traffic in each demultiplexed wavelength is then forwarded to an associated drop coupler 60a. Each drop coupler 60a splits the received traffic into two copies—one of which is dropped to an associated drop switch 132 and another which is forward to an associated switch 186. Each switch 186 is selectively configurable to either pass or terminate the forwarded copy of the traffic. As a result, traffic that has already been received by its intended destination or destinations may be terminated at node 44. Furthermore, switches 186 may be used to isolate particular light-trails, as described below. If the traffic is passed by the associated switch 186, the traffic is forwarded to an associated add coupler 60b.

Add coupler 60b receives traffic to be added to the associated ring 16 or 18 from an add switch 142 and combines this add traffic to the traffic forwarded from switch 186, if any. The combined traffic (or just the add traffic, if the switch terminates the traffic from coupler 60a) is then forwarded to multiplexer 184. Multiplexer 184 multiplexes the traffic in each wavelength received from add couplers 60b and then forwards this multiplexed traffic. Although a particular number of coupler/switch "sets" (which are each associated with a particular demultiplexed wavelength) are illustrated, any suitable number of such sets may be provided. Furthermore, although only a single drop coupler 60a and a single add coupler 60b are shown as being coupled to an associated drop switch 132 and add switch 142, respectively (and thus also coupled to an associated receiver 102 or transmitter 104), any suitable number of the couplers 60 may be coupled to allow traffic in particular wavelengths to be dropped from or added to rings 16 and 18.

As with nodes 40 and 42, transport elements 180 of node 44 may also include appropriate components to allow node 44 to transmit and receive information pertaining to the status and operation of fibers 16 and 18, other nodes, any light-trails established in network 10, or any other appropriate elements or functionality of optical network 10. In particular, each node 44 may include elements to allow node 44 to receive and transmit messages on an optical supervisory channel (OSC). As with nodes 40 and 42, each transport element 180 of node 44 includes an OSC ingress filter 66a that processes an ingress optical signal from its respective fiber 16 or 18. Each OSC filter 66a filters the OSC signal from the optical signal and forwards the OSC signal to a respective OSC receiver 112. Each OSC filter 66a also forwards the remaining optical signal to other components of transport element 180. Each transport element 180 also includes an OSC egress filter 66b that adds an OSC signal from an associated OSC transmitter 116 to the optical signal propagating on the associated fiber 16 or 18 and forwards the combined signal to elements located downstream on fiber 16 or 18. The added OSC signal may be locally-generated data or may be OSC data received by node 44 and passed through managing element 120.

As with node 42, node 44 also includes one or more drop switches 132 and one or more add switches 142. Each drop switch 132 selectively couples the dropped signal from one of the two drop couplers 60a associated with a particular wavelength (one coupler 60a being part of transport element 180a and the other being part of transport element 180b) to an associated port of burstponder 150. Similarly, each add switch 142 selectively couples a particular port of burstponder 150 to one of the two add couplers 60b associated with the particular wavelength being transmitted from that port. Alternatively, add switch 142 may be replaced by a coupler which can split a signal from the associated transmitter 104 and by a pair of shutters (one for each branch of the split signal) that can control whether the signal is added to fiber 16, fiber 18, or both fibers 16 and 18. As a result, drop switch 132 and add switch 142 may be utilized to support protection switching for node 44. Alternatively, particular embodiments of may omit drop switch 132 and add switch 142 and may each port of burstponder 150 associated with a particular wavelength to the both drop couplers 60a associated with that wavelength and both add coupler 60b associated with that wavelength.

Burstponder 150 converts bursty or time-interleaved optical traffic received from drop couplers 60a (via drop switches 132) to seamless and continuous electrical traffic for delivery to client devices of node 42 and converts electrical traffic received from client devices to optical traffic for transmission on fiber 16 or 18 in bursts via an associated add coupler 60b when the node 40 has use of the light-trail. As described above, burstponder 150 allows node 44 to time share a light-trail while creating an impression to client devices of the node 44 that the wavelength is available on a seamless and continuous basis (although at slower line rate). Burstponder 150 may include any appropriate number of receivers 102 operable to receive optical signals and generate electrical signals based on these optical signals and transmitters 104 operable to receive electrical signals and to transmit optical signals based on these electrical signals. Depending on the configuration of node 44, each of these receivers 102 and transmitters 104 may be fixed or tunable. Furthermore, each of these receivers 102 and transmitters 104 may be a burst-mode receiver or transmitter that has burst mode clock and data recovery operation.

As described below, switching element 160 may represent any appropriate component or components for transmitting electrical traffic output by burstponder 150 to appropriate client devices of node 44 and for transmitting electrical traffic received from client devices of node 44 to appropriate ports of burstponder 150 (such ports may each be associated with a particular transmitter 104). In a particular embodiment, switching element 160 comprises a Layer-2 (L2) switch. Although shown as part of node 44 in FIG. 2C, switching element 160 may be physically separate from node 44 in other embodiments.

As with nodes 40 and 42, node 44 includes a managing element 120 that comprises OSC receivers 112, OSC interfaces 114, OSC transmitters 116, and an element management system (EMS) 124. Each OSC receiver 112, OSC interface 114, and OSC transmitter 116 set forms an OSC unit for one of the fibers 16 or 18 in the node 44. The OSC units receive and transmit OSC signals for the EMS 124. EMS 124 may be communicably coupled to a network management system (NMS) 126. NMS 126 may reside within node 44, in a different node, or external to all nodes 40. The operation of EMS 124 and NMS 126 are the same as described above in conjunction with nodes 40 and 42.

In operation, transport elements 180 receive traffic from fibers 16 and 18. In the illustrated embodiment, traffic received from fibers 16 and 18 includes an OSC signal, and transport elements 180 are operable to add and drop the OSC signal to and from fibers 16 and 18. More specifically, each OSC ingress filter 66a processes an ingress optical signal from its respective fiber 16 or 18. OSC ingress filter 66a filters the OSC signal from the optical signal and forwards the OSC signal to its respective OSC receiver 112. Each OSC ingress filter 66a also forwards the remaining transport optical signal to the associated amplifier 64. Amplifier 64 amplifies the signal and forwards the signal to its associated coupler 60.

EMS 124 may process control messages transmitted by other nodes 44 or other components of optical network 10 and adjust operation of node 44 in response. In particular, EMS 124 may reconfigure switches 186, transmitters 104, receivers 102, and/or any other appropriate element of node 44 in response to control messages received by EMS 124. As one example, EMS 124 may, in response to receiving a setup message, configure one or more switches 186 of node 44 to either pass or terminate traffic propagating at particular wavelengths. Furthermore, EMS 124 may also generate control messages for transmission to other nodes 44 or other components of optical network 10. For example, EMS 124 may generate electronic signals associated with setup messages, intimation messages, request messages, and/or any other appropriate type of control messages and communicate these electronic signals to OSC transmitter 116 to transmit optical signals representing the appropriate control message to the associated transport element 180. These control messages may then be added to the optical traffic on fiber 16 or 18, as appropriate.

Meanwhile, each demultiplexer 182 demultiplexes a received optical signal propagating on the associated fiber 16 and 18 into its constituent wavelengths. The traffic in each demultiplexed wavelength is then forwarded to an associated drop coupler 60a. Each drop coupler 60a splits the received traffic into two copies—one of which is dropped to an associated drop switch 132. Each coupler 60a is coupled (via a drop switch 132) to a port of burstponder 150 that is associated with the wavelength of the traffic that was forwarded to that particular coupler 60a from the demultiplexer 182. In this manner, traffic in particular wavelengths of the dropped optical signal may be forwarded to burstponder 150.

Burstponder 150 receives particular wavelengths that are output from couplers 60a (the position of each drop switch 132 determines whether the received traffic in a particular wavelength is from a coupler 60a associated with ring 16 or ring 18). A receiver 102 in burstponder 150 that is associated with the wavelength of particular dropped traffic receives and converts the optical traffic into electrical traffic. The electrical traffic generated by each receiver 102 is then output to switching element 160. Again, in particular embodiments of node 44, burstponder 150 may include buffers and the output of receivers 102 may be stored in one or more buffers to be transmitted to switching element 160 at an appropriate time.

As described above in conjunction with nodes 40 and 42, switching element 160 receives electrical traffic output by burstponder 150 and switches this electrical traffic in any appropriate manner to facilitate transmission of this electrical traffic to an appropriate client device of node 44. As also noted above, switching element 160 also receives electrical traffic from client devices coupled to switching element 160 and switches this electrical traffic to communicate the electrical traffic to an appropriate port of burstponder 150.

Burstponder 150 receives electrical traffic from switching element 160 on one or more ports of burstponder 150. Certain ports of burstponder 150 are configured to receive electrical traffic from switching element 160, and each of these ports may pass the received electrical traffic to a particular transmitter 104 in burstponder 150 associated with that port. Each transmitter 104 may then generate optical traffic from the electrical traffic received from switching element 160 and transmit that optical traffic to an add coupler 60b associated with one of rings 16 or 18 (depending upon the position of add switches 142). As a result, optical traffic generated by transmitters 104 of burstponder 150 may be added to an appropriate fiber 16 or 18.

Returning to the operation of couplers 60a, in addition to forwarding the drop signal as described above, each coupler 60a forwards the through signal to its associated switch 186. The configuration of switches 186 allows selective termination or forwarding of each channel of the through signal. In a particular embodiment of node 44, EMS 124 may control operation of switches 186 to establish a light-trail on a specified wavelength on a particular fiber 16 or 18 in response to a setup message received from a convener node 44a. In particular, if node 44 represents a node on the interior of the requested light-trail, EMS 124 may configure a switch 186 associated with the wavelength of the light-trail to allow traffic propagating at that wavelength on the relevant fiber to pass through the switch 186. If node 44 represents a node 44 at the beginning or end of a light-trail, EMS 124 may configure a switch 186 associated with the wavelength of the light-trail to block traffic propagating at that wavelength on the relevant fiber. In this way, traffic transmitted by a node in a light-trail does not leave the light-trail. Because of this, multiple non-overlapping light-trails may be formed using the same wavelength in the same fiber.

The output of each switch 186 (if any) is forwarded to an associated add coupler 60b. Each add coupler 60b may receive traffic to be added to the associated ring 16 or 18 from an add switch 142 and combines this add traffic to the traffic forwarded from the associated switch 186 (if any). The combined traffic (or just the add traffic, if the switch terminates the traffic from coupler 60a) is then forwarded to multiplexer 184. Multiplexer 184 multiplexes the traffic in each wavelength received from add couplers 60b and then forwards this multiplexed traffic the associated amplifier 64 and OSC egress filter 66b. Each OSC egress filter 66b adds an OSC signal from the associated OSC transmitter 116 to the combined optical signal and forwards the new combined signal as an egress transport signal to the associated fiber 16 or 18 of optical network 10.

FIGS. 3A-3C illustrate example operation of nodes of an optical network in establishing a light-trail 330 (shown in FIG. 3C). In particular, FIGS. 3A-3C illustrate an example operation of a particular embodiment of an optical network as a particular node 314 attempts to establish a light-trail 330 in response to receiving electrical traffic from a client device of that node 314. Nodes 314 and fibers 316 and 318 shown in FIGS. 3A-3C may represent a complete optical network or may represent a portion of a larger optical network, such as optical network 10 shown in FIG. 1. Furthermore, although shown as being coupled in a linear manner, nodes 314 may be coupled in a ring, a mesh, or in any other suitable fashion. For example, nodes 314a-f may represent nodes 14a-f of network 10 of FIG. 1. Moreover, nodes 314 may have any suitable design. As an example only, nodes 314 may be implemented using the configuration of nodes 40, 42, or 44 illustrated in FIGS. 2A-2C or any other appropriate configuration.

FIG. 3A illustrates an example operation of an optical network as node 314a (referred to below as "convener node 314a") receives electrical traffic 310 from a client device coupled to convener node 314a. To transmit optical traffic based on the electrical traffic, convener node 314a determines that a light-trail 330 should be established between convener node 314a and node 314e (referred to below as "end node 314e") along fiber 16. As indicated above, convener node 314a may decide to establish light-trail 330 in response to determining that the amount of optical traffic flowing on other light-trails that couple convener node 314a and end node 314e exceeds a predetermined threshold. Alternatively, any other node or device may initiate the establishment of light-trail 330 for any suitable purpose.

Convener node 314a may establish light-trail 330 by sending one or more control messages to end node 314e and/or other nodes 314 on the OSC or other control channel. As used herein, a "message" may represent one or more signal pulses, packets, or frames, or information structured in any other suitable format. For example, in a particular embodiment, convener node 314a transmits a setup message 340 to end node 314e and to all nodes 314b-d between this particular convener node 314a and end node 314e in the direction of traffic. These nodes between the convener node and end node that are to be included in the light-trail may be referred to as "intervening nodes" (it should be noted, however, that not every node between the convener node and end node need be included in a light-trail). Depending on the configuration of the optical network, convener node 314a may transmit setup message 340 on the OSC in the same direction as optical traffic is flowing on fiber 316, in the opposite direction (for example, the OSC on fiber 318), or in both directions (for example, the OSC on both fibers 16 and 18). In the illustrated example, the OSC is assumed to represent a separate wavelength from the wavelengths used to transmit data on fiber 316, and convener node 314a transmits setup message 340 on fiber 316 in the direction traffic is propagating on fiber 316.

Setup message 340 may identify convener node 314a and end node 314e, specify the direction and wavelength to be used for transmissions on light-trail 330, and/or include any other appropriate information to be used by intervening nodes 314b-d and end node 314e to establish light-trail 330. Intervening nodes 314b-d may store setup message 340 until receiving an appropriate indication from end node 314e, such as an acknowledgement message, that end node 314e is prepared to establish light-trail 330.

FIG. 3B illustrates an example operation of the optical network after end node 314e receives setup message 340. End node 314e, in response to receiving setup message 340, may reconfigure a wavelength-blocking unit of end node 314e to prevent traffic propagating at the wavelength associated with the requested light-trail 330 from continuing past end node 314e on fiber 316. End node 314e transmits an acknowledgement message 350 to convener node 314a and/or intervening nodes 314b-d once end node 314e has configured the wavelength-blocking unit or at any other appropriate time after receiving setup message 340. Acknowledgement message 350 indicates to nodes 314 receiving the acknowledgment message that end node 314e is ready to establish light-trail 330. Convener node 314a and/or intervening nodes 314b-d may configure themselves in any appropriate manner to facilitate establishment of the light-trail, in response to receiving the acknowledgement message 350 or another appropriate form of indication from end node 314e. For example, intervening nodes 314b-d may each reconfigure a wavelength-blocking unit of each node 314 to allow the wavelength associated with light-trail 330 to pass through that particular node 314. Additionally, convener node 314a may configure a wavelength-blocking unit of convener node 314a to block traffic propagating on fiber 316 at the wavelength, as described above with respect to FIGS. 2A-2C. By blocking traffic propagating on fiber 316 at the wavelength associated with light-trail 330, convener node 314a may allow other light-trails that do not overlap with light-trail 330 to utilize the same wavelength as light-trail 330 without interfering with traffic transmitted on light-trail 330.

Additionally, each node 314 may maintain a light-trail table or matrix that maintains information regarding light-trails established on optical network 10 or light-trails to which that node 314 is coupled. These light-trail tables may include any appropriate information for the relevant light-trails. For example, light-trail tables may include information specifying the convener node and end node of each light-trail, the wavelength associated with each light-trail, whether each light-trail is currently being used, and/or any other suitable information about each light-trail.

FIG. 3C illustrates a state of optical network 10 after node 314a receives acknowledgement message 350 and performs any appropriate reconfiguration. As a result of the reconfiguration of convener node 314a, intervening nodes 314b-d and end node 314e, light-trail 330 is formed which couples convener node 314a to each intervening node 314b-d and to end node 314e. Once light-trail 330 is established, convener node 314a and/or intervening nodes 314b-d may utilize light-trail 330 for transmissions to downstream intervening nodes 314b-d or to end node 314e. Example operation of nodes in transmitting optical traffic on an established light-trail is described below with respect to FIGS. 4A and 4B.

Figure 4A:
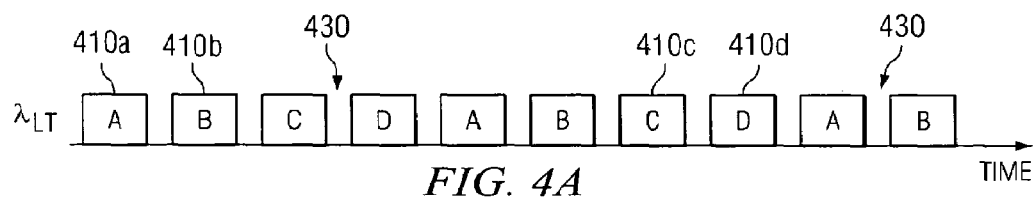
FIGS. 4A and 4B illustrate the use of time slots of a light-trail to share the light-trail between the nodes included in the light-trail.
Figure 4B:
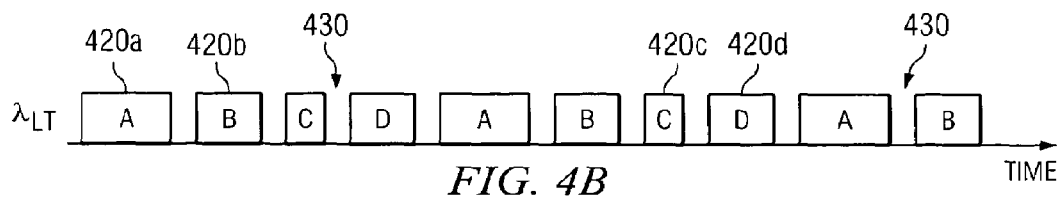

FIGS. 4A and 4B illustrate the use of time slots of a light-trail to share the light-trail between the nodes included in the light-trail. As illustrated, the data channel/wavelength at which a light-trail is established ($\lambda_{LT}$) may be divided into a plurality of time slots 410 or 420 to allow sharing of the light-trail between the nodes included in the light-trail. Unlike a structured time division multiplexed (TDM) system, these time slots are not frames or cells that include structure such as headers and other control information. They may simply be a specified duration of time on the data channel that is assigned to different nodes in the light-trail. Furthermore, there may be a gap or pad 430 between each time slot 410 or 420.

The duration of each time slot in a data channel of a light-trail may be equal or may vary. For example, FIG. 4A illustrates an example "round robin" technique for allocating use of a light-trail in which the time slots 410 associated with each node in the light-trail are equal. The example time slots 410 may be associated, as an example, with light-trail 330 of FIG. 3C that includes nodes 314a-e. In that case, any of nodes 314a-d may transmit data on light-trail 314 (node 314e, as the end node, does not transmit data on the light-trail). Therefore, each node 314a-d may be assigned associated time slots 410 in which the nodes 314 may transmit data. In the illustrated example, node 314a is assigned time slots 410a (identified with an "A"), node 314b is assigned time slots 410b (identified with a "B"), node 314c is assigned time slots 410c (identified with a "C"), and node 314d is assigned time slots 410d (identified with an "D"). The size of these time slots 410 are equal, such that each node is able to transmit the same amount of traffic on the light-trail. Since each of the nodes may receive data to be transmitted in different amounts and at different rates, each node may buffer traffic to be transmitted accordingly.

However, certain nodes have a need to transmit data at a higher rate than is provided by the associated time slots 410 in this "round robin" system, while other nodes in the light-trail may not need the bandwidth/capacity provided by the associated time slots 410. To address this issue, a "weighted round robin" technique may be used, as illustrated in FIG. 4B. The duration of the time slots 420 associated with each node may be different. In other words, the length of the time slots may be weighted such that certain nodes are allocated more of the bandwidth of the light-trail in which to transmit than other nodes. Again, the example time slots 420 may be associated, as an example, with light-trail 330 of FIG. 3C that includes nodes 314a-e. In the illustrated example, node 314a is assigned time slots 420a (identified with an "A") that are longer in duration that the time slots 420 associated with the other nodes, node 314b is assigned time slots 420b (identified with a "B") and node 314d is assigned time slots 420d (identified with an "D") which are the same size and which are smaller than slots 420a, and node 314c is assigned time slots 420c (identified with a "C") which are smaller than slots 420a-c. In this manner, nodes on the light-trail that have higher bandwidth requirements may be given more capacity to transmit. In other embodiments, this same result may be accomplished using equally sized time slots, but allocating more time slots to certain nodes than to other nodes.

The duration of slots 410 or 420 may be configured via NMS 126 when the network is initially configured (and may be changed as needed), when a light-trail is established, or at any other appropriate time. In particular embodiments, the duration of slots 410 or 420 is communicated from NMS 126 or another appropriate component to the end node of a light-trail when the light-trail is being established. The end node sends control messages to the other nodes in the light-trail indicating the duration and positioning of the time slots associated with each node. Although particular example techniques for configuring and using time slots are described herein, it should be understood that any other suitable techniques may be used.

Although the present invention has been described with several embodiments, various changes and modifications may be suggested to one skilled in the art. It is intended that the present invention encompass such changes and modifications as fall within the scope of the appended claims.

What is claimed:

1. An optical network operable to carry optical traffic in a plurality of multiplexed wavelengths between a plurality of nodes, the optical network comprising:
   at least one light-trail established in the optical network between a convener node and an end node, wherein the light-trail couples the convener node, one or more intervening nodes, and the end node, and wherein the light-trail is associated with one of the plurality of wavelengths;
   an out-of-band control channel associated with a different wavelength than the wavelength associated with the at least one light-trail, the control channel being used to communicate one or more control messages to establish the light-trail and to allocate use of the light-trail by the convener node and the intervening nodes, the convener nodes and the intervening nodes time-sharing the light-trail by each node only transmitting at times allocated to such node using the control channel; and
   wherein each of the convener node, the one or more intervening nodes, and the end node comprises one or more optical components operable to:
      receive optical traffic in a plurality of multiplexed wavelengths from the optical network, to drop a first copy of the multiplexed optical traffic from the optical network, and to forward a second copy of the multiplexed optical traffic on the optical network;
      receive the dropped first copy of the multiplexed optical traffic and forward the optical traffic in selected wavelengths of the plurality of wavelengths for communication to one or more client devices associated with the node;
      convert traffic received from one or more client devices of the node into client optical traffic in one or more wavelengths; and
      passively add the client optical traffic to the second copy or to a modification of the second copy to form a combined signal and forward the combined signal to the network.

2. The optical network of claim 1, wherein the one or more optical components include one or more optical couplers operable to drop the first copy, forward the second copy, and passively add the client optical traffic to the forwarded second copy or to the modification of the forwarded second copy.

3. The optical network of claim 2, wherein the one or more couplers comprise a single coupler.

4. The optical network of claim 2, wherein the one or more couplers comprise:
   a drop coupler configured to drop the first copy and forward the second copy; and
   an add coupler configured to passively add the client optical traffic to the forwarded second copy or to the modification of the forwarded second copy.

5. The optical network of claim 1, wherein each of the convener node, the one or more intervening nodes, and the end node further comprises a wavelength blocking unit operable to receive the second copy of the multiplexed optical traffic and to terminate traffic in one or more of the multiplexed wavelengths to create the modification of the second copy.

6. The optical network of claim 5, wherein the wavelength blocking unit comprises a wavelength selective switch.

7. The optical network of claim 5, wherein each of the intervening nodes is operable to configure a wavelength-blocking unit of that intervening node, in response to the establishment of a light-trail, to allow optical traffic propagating at the wavelength associated with the light-trail to pass through that intervening node.

8. The optical network of claim 5, wherein:
   the convener node is operable to configure a wavelength-blocking unit of the convener node to prevent optical traffic propagating at the wavelength associated with the light-trail from passing through the convener node; and
   wherein the end node is further operable to configure a wavelength-blocking unit of the end node to prevent optical traffic propagating at the wavelength associated with the light-trail from passing through the end node, thus isolating the light-trail.

9. The optical network of claim 1, wherein each of the convener node, the one or more intervening nodes, and the end node further comprises one or more optical components operable to receive the dropped first copy and to forward the optical traffic in a subset of the plurality of multiplexed wavelengths of the first copy to one or more client devices of the node.

10. The optical network of claim 9, wherein the one or more optical components operable to receive the dropped first copy and to forward the optical traffic in a subset of the plurality of multiplexed wavelengths comprise a wavelength selective switch.

11. The optical network of claim 9, wherein the one or more optical components operable to receive the dropped first copy and to forward the optical traffic in a subset of the plurality of multiplexed wavelengths comprise:
   one or more optical couplers operable to create a plurality of copies of the dropped first copy; and
   a plurality of filters, each filter operable to receive one of the plurality of copies, forward the optical traffic in one or more wavelengths of the associated copy, and terminate the optical traffic in the remaining wavelengths.

12. A method for transmitting traffic in an optical network, the optical network operable to carry optical traffic in a plurality of multiplexed wavelengths between a plurality of nodes, the method comprising:
   establishing at least one light-trail in the optical network between a convener node and an end node, wherein the light-trail couples the convener node, one or more intervening nodes, and the end node, and wherein the light-trail is associated with one of the plurality of wavelengths, wherein establishing the light-trail comprises transmitting one or more control messages on an out-of-band control channel that is associated with a different wavelength than the wavelength associated with the light-trail;

allocating use of the light-trail by the convener nodes and the intervening nodes using the out-of-band control channel, the convener nodes and the intervening nodes time-sharing the light-trail according to the allocation; and at one or more of the convener node and the one or more intervening nodes:

receiving optical traffic in a plurality of multiplexed wavelengths from the optical network, dropping a first copy of the multiplexed optical traffic from the optical network, and forwarding a second copy of the multiplexed optical traffic on the optical network;

receiving the dropped first copy of the multiplexed optical traffic and forwarding the optical traffic in selected wavelengths of the plurality of wavelengths for communication to one or more client devices associated with the node;

converting traffic received from one or more client devices of the node into client optical traffic in one or more wavelengths; and passively adding the client optical traffic to the second copy or to a modification of the second copy to form a combined signal and forwarding the combined signal to the network, wherein each convener node and intervening node only adds client traffic to the second copy when it had been allocated use of the light-trail.

13. The method of claim 12, wherein each of the convener node, the one or more intervening nodes, and the end node include one or more optical couplers operable to drop the first copy, forward the second copy, and passively add the client optical traffic to the forwarded second copy or to the modification of the forwarded second copy.

14. The method of claim 13, wherein the one or more couplers comprise a single coupler.

15. The method of claim 13, wherein the one or more couplers comprise:

a drop coupler configured to drop the first copy and forward the second copy; and an add coupler configured to passively add the client optical traffic to the forwarded second copy or to the modification of the forwarded second copy.

16. The method of claim 12, further comprising, using a wavelength blocking unit at one or more of the convener node, the one or more intervening nodes, and the end node, receiving the second copy of the multiplexed optical traffic and to terminating traffic in one or more of the multiplexed wavelengths to create the modification of the second copy.

17. The method of claim 16, wherein the wavelength-blocking unit comprises a wavelength selective switch.

18. The method of claim 16, further comprising configuring the wavelength-blocking unit of each intervening node, in response to the establishment of a light-trail, to allow optical traffic propagating at the wavelength associated with the light-trail to pass through each intervening node.

19. The method of claim 16, further comprising configuring the wavelength blocking unit of the convener node and the end node to prevent optical traffic propagating at the wavelength associated with the light-trail from passing through the convener node and the end node, thus isolating the light-trail.

20. The method of claim 12, further comprising, at one or more of the convener node, the one or more intervening nodes, and the end node:

receiving the dropped first copy; and forwarding the optical traffic in a subset of the plurality of multiplexed wavelengths of the first copy to one or more client devices of the node.

21. The optical method of claim 20, wherein the receiving an forwarding steps are performed using a wavelength selective switch.

22. The optical method of claim 20, wherein the receiving an forwarding steps are performed using:

one or more optical couplers operable to create a plurality of copies of the dropped first copy; and a plurality of filters, each filter operable to receive one of the plurality of copies, forward the optical traffic in one or more wavelengths of the associated copy, and terminate the optical traffic in the remaining wavelengths.

* * * * *